(12) United States Patent
Yamamoto et al.

(10) Patent No.: US 11,511,558 B2
(45) Date of Patent: Nov. 29, 2022

(54) OPTICAL ELEMENT, TRANSFER FOIL, AUTHENTICATION MEDIUM, AND METHOD OF VERIFYING AUTHENTICATION MEDIUM

(71) Applicant: TOPPAN PRINTING CO., LTD., Tokyo (JP)

(72) Inventors: Hanako Yamamoto, Tokyo (JP); Keitaro Sugihara, Tokyo (JP); Tomoko Tashiro, Tokyo (JP); Akihito Kagotani, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 144 days.

(21) Appl. No.: 17/021,769

(22) Filed: Sep. 15, 2020

(65) Prior Publication Data

US 2021/0001659 A1    Jan. 7, 2021

Related U.S. Application Data

(63) Continuation of application No. PCT/JP2019/011841, filed on Mar. 20, 2019.

(30) Foreign Application Priority Data

Mar. 20, 2018 (JP) .............................. JP2018-053545
Jan. 30, 2019 (JP) .............................. JP2019-014299

(51) Int. Cl.
*B42D 25/324* (2014.01)
*B42D 25/328* (2014.01)
(Continued)

(52) U.S. Cl.
CPC ......... *B42D 25/328* (2014.10); *B42D 25/324* (2014.10); *G02B 27/4205* (2013.01);
(Continued)

(58) Field of Classification Search
CPC ........................... B42D 25/324; B42D 25/328
See application file for complete search history.

(56) References Cited

U.S. PATENT DOCUMENTS 6,060,143 A * 5/2000 Tompkin .......... G06K 19/06046
428/209
7,102,823 B2   9/2006 Schilling et al.
(Continued)

FOREIGN PATENT DOCUMENTS

JP    2005-514672 A    5/2005
JP    2009-075169 A    4/2009
(Continued)

OTHER PUBLICATIONS

International Searching Authority, "International Search Report," issued in connection with International Patent Application No. PCT/JP2019/011841, dated Jun. 25, 2019.
(Continued)

*Primary Examiner* — Kyle R Grabowski
(74) *Attorney, Agent, or Firm* — Foley & Lardner LLP

(57) ABSTRACT

A subwavelength grating displaying a colored image exhibiting a color corresponding to a grating period of a subwavelength grating in reflection directions including a specular reflection direction. A relief surface displaying a reflection image in monochromatic reflected light in reflection directions including a direction different from the specular reflection direction. An optical element has a first state in which neither a colored image nor a reflection image is displayed, a second state in which the colored image is mainly displayed, and a third state in which the reflection image is mainly displayed. A plane in which the optical element is disposed and a plane including a line of sight of an observer form an observation angle therebetween. The
(Continued)

optical element is observed in any of the first, second and third states according to the observation angle.

10 Claims, 21 Drawing Sheets

(51) Int. Cl.
    *G02B 27/42*     (2006.01)
    *G07D 7/1205*     (2016.01)
    *G02B 5/18*     (2006.01)

(52) U.S. Cl.
    CPC ......... *G02B 5/1866* (2013.01); *G07D 7/1205* (2017.05); *G07D 2207/00* (2013.01)

(56) References Cited

U.S. PATENT DOCUMENTS

| | | |
|---|---|---|
| 9,134,468 B2 | 9/2015 | Noizet et al. |
| 9,902,187 B2 * | 2/2018 | Holmes .................. B42D 25/36 |
| 2005/0170259 A1 * | 8/2005 | Holmes .................. B42D 25/29 |
| | | 430/1 |
| 2007/0247714 A1 * | 10/2007 | Schnieper .............. G06K 19/16 |
| | | 359/558 |
| 2015/0251480 A1 * | 9/2015 | Souparis ................ B42D 25/29 |
| | | 156/182 |
| 2017/0334232 A1 * | 11/2017 | Yashiki ................ B42D 25/328 |
| 2018/0037049 A1 * | 2/2018 | Fuhse .................. B42D 25/351 |

FOREIGN PATENT DOCUMENTS

| | | | | |
|---|---|---|---|---|
| JP | 2009075169 A | * | 4/2009 | |
| JP | 2013-527938 A | | 7/2013 | |
| JP | 2013-190629 A | | 9/2013 | |
| WO | WO-2006038120 A1 | * | 4/2006 | ............ B42D 15/00 |
| WO | WO-2015181289 A1 | * | 12/2015 | ........... B42D 25/324 |

OTHER PUBLICATIONS

International Searching Authority, "Written Opinion," issued in connection with International Patent Application No. PCT/JP2019/011841, dated Jun. 25, 2019.

* cited by examiner

OPTICAL ELEMENT, TRANSFER FOIL, AUTHENTICATION MEDIUM, AND METHOD OF VERIFYING AUTHENTICATION MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/011841, filed on Mar. 20, 2019, which is based upon and claims the benefit of priority to Japanese Patent Application Nos. 2018-053545, filed on Mar. 20, 2018; and 2019-014299, filed Jan. 30, 2019, the disclosures of which are all incorporated herein by reference in their entireties.

TECHNICAL FIELD

Embodiments of the present invention relate to an optical element, a transfer foil, an authentication medium, and a method of verifying the authentication medium.

BACKGROUND

Optical elements using holograms, diffraction gratings, multilayer interference films and the like are affixed to securities such as gift certificates, banknotes and credit cards to prevent counterfeiting, and also affixed to articles for brand protection of the articles. Because of being difficult to produce, such optical elements have an effect of better preventing counterfeiting of the articles to which the optical elements are affixed.

Optical elements whose authenticity can be verified by only visual observation without using a special verifier are widely used as the above-mentioned optical elements. Among them, optical elements of a type changing the observed color or the displayed image according to the observation angles are widely used. Optical elements which change color according to observation angle may be diffraction gratings, multilayer interference films or the like mentioned above.

Diffraction gratings and multilayer interference films have characteristics of continuously changing color observed by the observer as the angle of observing the optical elements is changed. Thus, since multiple colors are observed by the observer, it is difficult to clearly define the colors that should be observed when verifying the authenticity of such an optical element. Furthermore, when verifying the authenticity of such an optical element, it is difficult for the observer to find a suitable angular range for verification from the angular range of observing the optical element.

To solve such issues, subwavelength gratings developing predetermined colors have been used as optical elements. The subwavelength gratings have a microstructure with a period of not more than the wavelength of visible light. The subwavelength gratings have characteristics of causing only the light with a specific wavelength to emerge in a specular reflection direction, of the light incident on the subwavelength gratings. Therefore, when such a subwavelength grating as an optical element is observed in a direction other than the specular reflection direction, the observer cannot observe the light having a predetermined color in the optical element. Thus, unlike the diffraction gratings and multilayer interference films, subwavelength gratings can specify the angle at which the optical element should be observed and the color that should be observed at this angle. For this reason, the method of verifying the authenticity of the optical element can be clearly defined. As an example of the anti-counterfeiting optical element using such a subwavelength grating, the optical element disclosed in PTL 1 can be mentioned.

CITATION LIST

Patent Literature

[PTL 1] JP 2013-527938 A

SUMMARY OF THE INVENTION

Technical Problem

According to PTL 1, the optical element, after being observed at a first angle at which a first color is observed, is rotated about a rotational axis which is a normal line to the plane in which the optical element is disposed. Then, the optical element is observed at a second angle at which a second color is observed to verify the authenticity of the optical element.

The observer's action of rotating an optical element by hand is not natural compared to the action of tilting an optical element. Thus, the observer's ease of verification tends to be lowered, which may tend to lower the efficiency for verification. As mentioned above, in subwavelength gratings, light having a predetermined color emerges only in the specular reflection direction. Thus, the observer is less likely to observe the color exhibited by the optical element at the instant the observer holds the optical element, or at the instant the observer places the optical element on a flat surface and observes the optical element. That is, the observer is less likely to observe the optical element in the specular reflection direction at these instants. Therefore, after finding the angle for observing the color exhibited by the optical element, the observer needs to rotate the optical element, and even after this rotation, further needs to find the angle for observing another color exhibited by the optical element. As a result, a long time is required before the observer can verify the authenticity of the optical element. Therefore, an optical element enabling easier authenticity verification has been sought.

The present invention aims to provide an optical element enabling easier authenticity verification, a transfer foil, an authentication medium, and a method of verifying the authentication medium.

Solution to Problem

An optical element for solving the above issues includes a first layer, a second layer contacting the first layer, and a third layer contacting the second layer, each layer having optical transparency.

The first layer is a resin layer having a first refractive index and having a first surface contacting the second layer, at least part of the first surface including a subwavelength grating. The second layer is a dielectric layer having a second refractive index which is higher than the first refractive index and having a second surface contacting the first surface of the first layer, the second surface having asperities conforming to the subwavelength grating. The third layer is a resin layer having a third refractive index lower than the second refractive index.

Any of the first layer, the second layer, and the third layer is a relief layer, the relief layer having a relief surface including a plurality of reflective surfaces, the reflective surfaces adjacent to each other having a pitch therebetween greater than a pitch of the subwavelength grating.

When observing a state in which light is applied to the optical element from a light source located on a side of the second layer opposite to that facing the third layer, from the light source side, the subwavelength grating displays a colored image exhibiting a color corresponding to a grating period of the subwavelength grating in reflection direction including a specular reflection direction, and the relief surface displays a reflection image in monochromatic reflected light, i.e., a monochromatic image, in reflection directions including a direction different from the specular reflection direction. The optical element has a first state in which neither the colored image nor the reflection image is displayed, a second state in which the colored image is mainly displayed, and a third state in which the reflection image is mainly displayed. A plane in which the optical element is disposed and a plane including a line of sight of an observer form an observation angle therebetween. The optical element is observed in any of the first state, the second state, and the third state according to the observation angle.

An optical element for solving the above issues includes a first layer, a second layer contacting the first layer, and a third layer contacting the second layer, each layer having optical transparency.

The first layer is a resin layer having a first refractive index and having a first surface contacting the second layer, at least part of the first surface including a subwavelength grating. The second layer is a dielectric layer having a second refractive index which is higher than the first refractive index and having a second surface contacting the first surface of the first layer, the first surface having asperities conforming to the subwavelength grating. The third layer is a resin layer having a third refractive index lower than the second refractive index.

Any of the first layer, the second layer, and the third layer is a relief layer, the relief layer having a relief surface including a plurality of reflective surfaces, the reflective surfaces adjacent to each other having a pitch therebetween greater than a pitch of the subwavelength grating.

When observing a state in which light is applied to the optical element from a light source located on a side of the second layer opposite to that facing the third layer, from the light source side, the subwavelength grating displays a colored image exhibiting a color corresponding to a grating period of the subwavelength grating in reflection direction including a specular reflection direction, and the relief surface displays a reflection image in monochromatic reflected light, i.e., a monochromatic image, in reflection directions including a direction different from the specular reflection direction. The optical element has a first state in which neither the colored image nor the reflection image is displayed, a second state in which the colored image is mainly displayed, and a third state in which the reflection image is mainly displayed. A plane in which the optical element is disposed and a plane including a line of sight of an observer form an observation angle therebetween. The optical element is observed in any of the first state, the second state, and the third state according to the observation angle.

A transfer foil for solving the above issues includes an adhesive member, which includes the above optical element, and an adhesive layer for adhering the optical element to a transfer target.

An authentication medium for solving the above issues includes the above optical element.

With this configuration, the optical element displays a reflection image produced by monochromatic reflected light, i.e., a monochromatic image, and a colored image produced by light having a specific wavelength, i.e., a multihued image. When distinguishing between monochromatic and multihued images, i.e., between two images, subjective differences are less likely to occur compared to distinguishing between a first monochromatic image and a second monochromatic image, or between a first multihued image and a second multihued image. Consequently, compared to the case in which the authenticity of the optical element is verified based on two multihued images or two monochromatic images, subjective differences are less likely to occur and the criteria for verifying the authenticity can be easily defined in the above optical element. Thus, according to the optical element, authenticity can be verified even more easily.

DETAILED DESCRIPTION

Description of the Embodiments

First Embodiment

Figure 1:
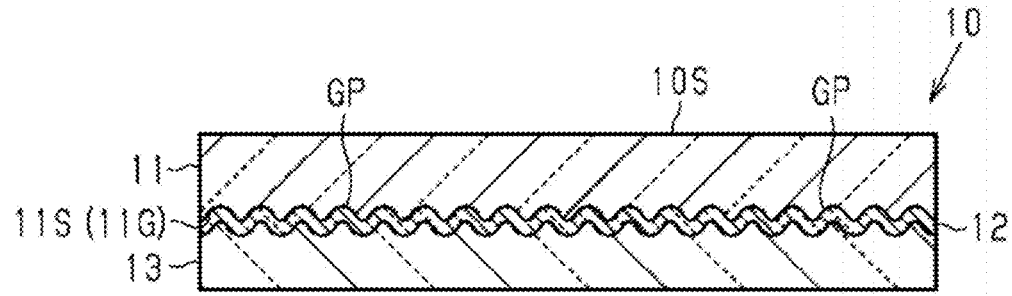
FIG. 1 is a schematic cross-sectional view illustrating a structure of an optical element according to a first embodiment of the present invention.

Referring to FIGS. 1 to 11, a first embodiment of an optical element of the present invention will be described. In the drawings, components exerting identical or similar functions are all denoted by the same reference signs to omit duplicate explanation. The embodiments of the present invention of the present disclosure are a group of embodiments based on one unique invention based on the Background Art. The aspects of the present disclosure are aspects of the group of embodiments based on one invention. Configurations of the present disclosure can have the respective aspects of the present disclosure. Features of the present disclosure can be combined to form the configurations. Thus, the features, configurations, aspects and embodiments of the present disclosure can be combined, and the combinations each have synergistic functions and can exert synergistic effects.

FIG. 1 shows an optical element 10 including a first layer 11, a second layer 12 contacting the first layer 11, and a third layer 13 contacting the second layer 12. These layers have optical transparency. The optical element 10 can form the entire or a part of a security seal. In other words, the security seal can include the optical element 10. The optical element 10 can be a visible motif. The security seal may be provided in the form of a patch, stripe, overlay, or sticker. The state in which light is applied to the optical element 10 from a light source located on the side of the second layer 12 opposite to that facing the third layer 13 is observed from the side of the second layer 12 opposite to that facing the third layer 13. In the optical element 10, the surface of the first layer 11 facing away from the surface contacting the second layer 12 is an observation surface 10S observed by an observer.

The first layer 11 is a resin layer having a first refractive index. The first layer 11 has a surface 11S contacting the second layer 12 and at least partially including a subwavelength grating 11G. The second layer 12 is a dielectric layer having a second refractive index which is higher than the first refractive index. The second layer 12 has asperities conforming to the subwavelength grating 11G. The third layer 13 is a resin layer having a third refractive index lower than the second refractive index. The subwavelength grating 11G is formed by a plurality of grating patterns GP arranged in one direction. The grating patterns GP may be an array of convexities and concavities where one convexity is alternated with one concavity in one direction. The grating patterns GP are disposed over the surface 11S. The convexities and concavities may be elongated as a long axes in a direction perpendicular to the array direction. The period of the grating patterns GP in the subwavelength grating 11G can be less than a visible wavelength. As an example, the period of the grating patterns GP can be less than 680 nm. The period of the grating patterns GP can be no more than the shortest wavelength of visible light. In other words, the period of the grating patterns GP can be 400 nm or less. The subwavelength grating 11G can diffract incident light. The subwavelength grating 11G can guide diffracted light having a wavelength corresponding to the grating period to the second layer 12. The light guided to the second layer 12 is guided light. The guided light is diffracted in a specular reflection direction of the incident light. In other words, the subwavelength grating 11G selectively causes the incident light to emerge in the specular reflection direction.

The first layer 11 may have a refractive index equal to or different from that of the third layer 13. The difference in refractive index between the first and second layers 11 and 13 is preferred to be 0.2 or less, and more preferably 0.1 or less. The difference in refractive index between the first and second layers 11 and 12 and the difference in refractive index between the third and second layers 13 and 12 may each be 0.3 or more, or 0.5 or more.

In the surface 11S of the first layer 11, the region where the subwavelength grating 11G is located is an uneven surface. In the present embodiment, the entire surface 11S is an uneven surface. However, only a part of the surface 11S may be an uneven surface.

Figure 2:
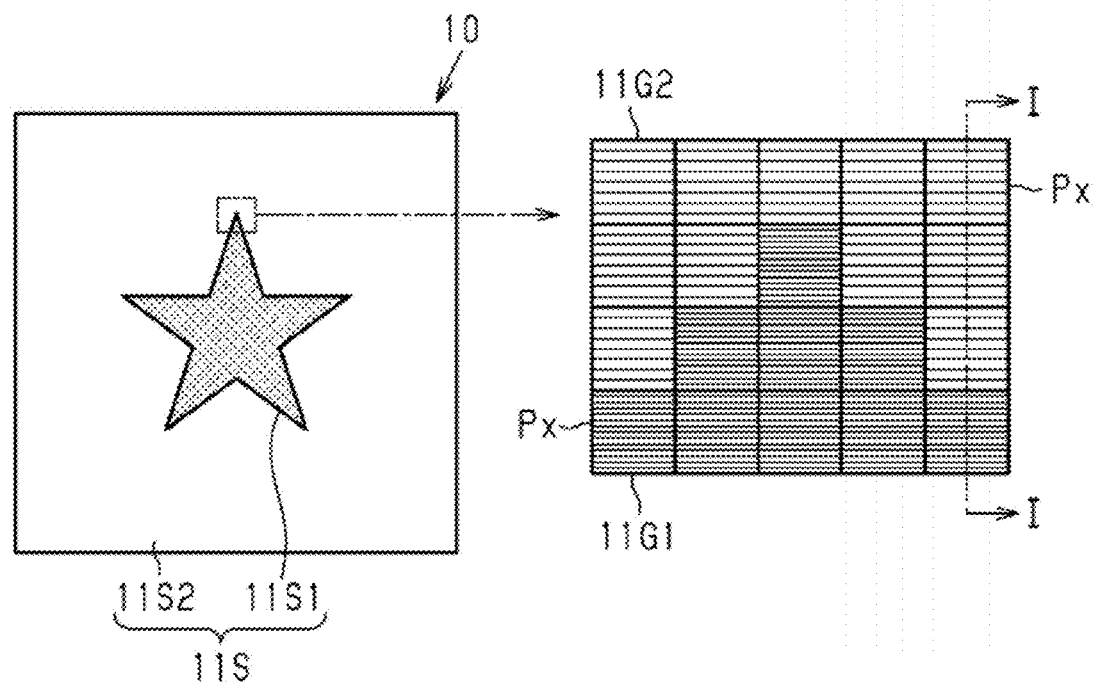
FIG. 2 is a set of a schematic plan view and an enlarged view thereof, illustrating a structure of the optical element according to the first embodiment of the present invention.

FIG. 2 is a set of diagrams showing a structure of the optical element 10 as viewed perpendicular to the observation surface 10S. Hereinafter, for convenience of illustration and description, the surface 11S of the first layer 11, i.e., the surface of the first layer 11 at the interface with the second layer 12, will be described making use of the structure as viewed perpendicular to the observation surface 10S. In FIG. 2, for convenience of illustration, the directions in which the grating patterns GP of the subwavelength grating 11G extend are indicated by straight lines.

As shown in FIG. 2, the surface 11S as an example of the uneven surface includes a first region 11S1 and a second region 11S2 that surrounds the first region 11S1 as viewed perpendicular to the surface 11S. In the present embodiment, the surface 11S is configured by the first region 11S1 and the second region 11S2. However, the surface 11S may include a region other than the first and second regions 11S1 and 11S2.

The subwavelength grating belonging to the first region 11S1 is a first subwavelength grating 11G1. The subwavelength grating belonging to the second region 11S2 is a second subwavelength grating 11G2. The azimuth angle of the first subwavelength grating 11G1 and that of the second subwavelength grating 11G2 may be equal to each other. The grating period of the first subwavelength grating 11G1 and that of the second subwavelength grating 11G2 may be different from each other. The grating period of the subwavelength grating 11G refers to the period of the grating patterns GP mentioned above. The azimuth angle of the subwavelength grating 11G refers to an angle between a reference line set on a plane in which the first layer 11 is disposed and the grating patterns GP.

A plurality of pixel regions Px are defined in the first and second regions 11S1 and 11S2. Each pixel region Px is preferred to have an area of $0.1 \text{ mm}^2$ or less. A plurality of pixel regions Px are arranged on the entire surface 11S of the first layer 11 without gaps. In the present embodiment, as viewed perpendicular to the surface 11S, each pixel region Px has a square shape. However, each pixel region Px may have an equilateral triangular shape, an equilateral hexagonal shape, or the like. Each pixel region Px may have a polygonal shape and may have sides with different lengths. In each pixel region Px, each side is preferred to have a length of 0.3 mm or less. Each side is more preferred to have a length of 0.08 mm or less. In this case, since the length of one side of each pixel region Px is smaller than the resolution of the human eye, individual pixel regions Px are not visually recognized by the observer. Thus, the optical element 10 can display a high-resolution image.

Figure 3:
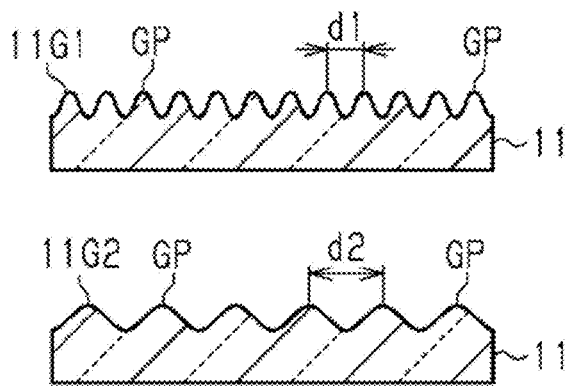
FIG. 3 is a set of schematic cross-sectional views illustrating the structure taken along the line I-I of FIG. 2.

FIG. 3 is a set of diagrams each illustrating a cross-sectional structure of the subwavelength grating 11G taken along the line I-I of FIG. 2. In FIG. 3, for convenience of illustration, the cross-sectional structures of the first and second subwavelength gratings 11G1 and 11G2 are vertically arranged as viewed in the drawing. The cross-sectional structure of each subwavelength grating schematically shows the cross-sectional structure corresponding to one pixel region Px. In FIG. 3, for convenience of illustration, each subwavelength grating is shown as a surface configuring convexities projected in a direction away from the flat surface.

As shown in FIG. 3, the grating period of the first subwavelength grating 11G1 is different from that of the second subwavelength grating 11G2. The grating period of the first subwavelength grating 11G1 is a first period d1, and that of the second subwavelength grating 11G2 is a second period d2. In the present embodiment, the first period d1 is smaller than the second period d2. However, the first period d1 may be greater than the second period d2. In the present embodiment, each subwavelength grating has a wave shape repeated in one direction, and the waves correspond to the grating patterns GP configuring the subwavelength grating. The distance between adjacent two grating patterns GP corresponds to the grating period of each subwavelength grating.

In the cross section taken along the direction in which the grating patterns GP are arranged, the plurality of grating patterns GP in the first subwavelength grating 11G1 have the same shape. In the cross section taken along the direction in which the grating patterns GP are arranged, the plurality of grating patterns GP included in the second subwavelength grating 11G2 have the same shape.

The wavelength of light emerging from a subwavelength grating depends on the grating period of the subwavelength grating. Specifically, the hue exhibited by the optical element 10 including a subwavelength grating, or in other words, the color visually recognized by the observer as the hue of the optical element 10, depends on the grating period of the subwavelength grating.

Figure 4:
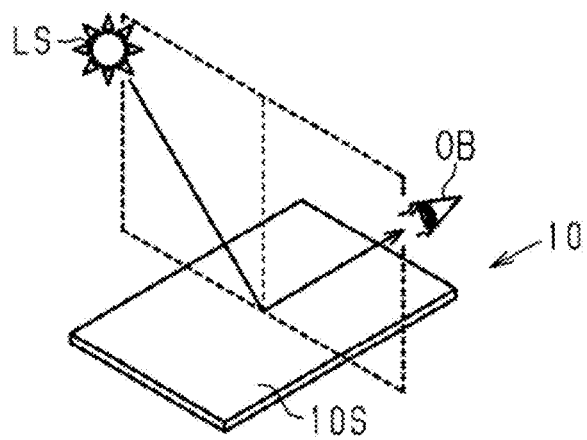
FIG. 4 is a schematic diagram illustrating functions of the first embodiment of the present invention.

As shown in FIG. 4, in the optical element 10, when a light source LS and an observer OB are symmetrically located about a line normal to the observation surface 10S on a plane perpendicular to the observation surface 10S of the optical element 10, the observer OB can observe zeroth-order diffracted light emerging from the optical element 10. In other words, the light incident on the optical element 10 from the light source LS can emerge therefrom in the specular reflection direction of the incident light with a wavelength according to the grating period of the subwavelength grating 11G.

As mentioned above, in the present embodiment, the grating period of the subwavelength grating is set to not more than the shortest wavelength of visible light, i.e., set to 400 nm or less. However, the grating period for causing only the zeroth-order diffracted light having a specific wavelength to emerge in a specific direction depends, for example, on the refractive index of the subwavelength grating, the angle of light incident on the subwavelength grating, and the like. Hereinafter, the conditions where only the zeroth-order diffracted light emerges from the subwavelength grating, or in other words, the conditions where first-order diffracted light does not emerge from the subwavelength grating will be described.

It is known that the following Formula (1) is satisfied in reflective diffraction gratings.

$$\sin \theta_1 + \sin \theta_2 = m\lambda/nd \quad \text{Formula (1)}$$

In Formula (1), $\theta_1$ is an incidence angle of light incident on the diffraction grating, $\theta_2$ is a diffraction angle of the diffracted light emerging from the diffraction grating, and m is a diffraction order of the diffracted light. Furthermore, $\lambda$ is a wavelength, n is a refractive index of the diffraction grating, and d is a grating period of the diffraction grating.

Let us discuss now the first-order diffracted light assuming that the refractive index n is 1 and light is perpendicularly incident on the plane in which the diffraction grating is disposed. In this case, the incidence angle $\theta_1$ is 0° and the diffraction order m is 1. Thus, when these numerical values are substituted into Formula (1), the following Formula (2) is obtained.

$$\sin \theta_2 = \lambda/d \quad \text{Formula (2)}$$

Since $\sin \theta_2$ is −1 or more and 1 or less, when the right side ($\lambda/d$) of Formula (2) is greater than 1, Formula (2) is not satisfied. In other words, if the right side ($\lambda/d$) is greater than 1, the first-order diffracted light does not emerge from the diffraction grating. Thus, under the above assumption, when the grating period of the diffraction grating is smaller than the wavelength, only the zeroth-order diffracted light emerges from the diffraction grating.

If the refractive index is not 1 and if the incidence angle $\theta_1$ is not 0°, diffracted light other than the zeroth-order diffracted light may emerge from the diffraction grating. For example, let us discuss the first-order diffracted light assuming that the incidence angle $\theta_1$ is 30° and the wavelength $\lambda$ is 600 nm. In this case, the incidence angle $\theta_1$ is 30°, the wavelength $\lambda$ is 600 nm, and the diffraction order m is 1. Thus, when these numerical values are substituted into Formula (1), the following Formula (3) is obtained.

$$\frac{1}{2} + \sin \theta_2 = 600/nd \quad \text{Formula (3)}$$

Since $\sin \theta_2$ is −1 or more and 1 or less, if the left side ($\frac{1}{2}+\sin \theta_2$) of Formula (3) is −0.5 or more and 1.5 or less, and the product of the refractive index n and the grating period d is 0 or more and 400 or less, first-order diffracted light emerges from the diffraction grating, according to the combination of the refractive index n and the grating period d. For example, the combination (n, d) of the refractive index n and the grating period d when the first-order diffracted light emerges is as follows.

$$(n,d)=(1,400),(1.5,200),(2,100)$$

In this manner, the diffracted light of the first-order diffracted light or higher may emerge depending on the refractive index n of the diffraction grating, even if the grating period d of the diffraction grating is not more than the wavelength $\lambda$. In other words, the diffraction grating can be formed so that the diffracted light higher than the zeroth-order diffracted light does not emerge from the diffraction grating while the zeroth-order diffracted light emerges therefrom by controlling the grating period d and the refractive index n of the diffraction grating.

The diffraction grating can also be configured so that the first-order diffracted light is not observed by the observer while the zeroth-order diffracted light is observed by the observer in a state where the position of the diffraction grating is fixed relative to the observer, by designing the diffraction angle $\theta_2$ of the first-order diffracted light to be significantly greater than the diffraction angle $\theta_2$ of the zeroth-order diffracted light. This increases flexibility when selecting the material for forming the diffraction grating, or flexibility of the grating period of the diffraction grating.

Figure 5:
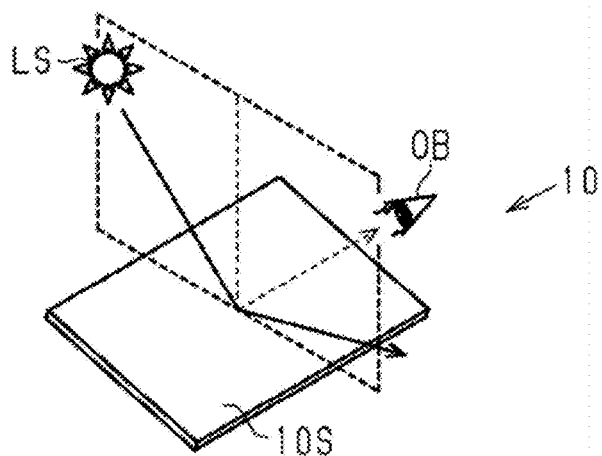
FIG. 5 is a schematic diagram illustrating functions of the first embodiment of the present invention.

As shown in FIG. 5, in a state where the light source LS and the viewpoint of the observer OB are fixed, the optical element 10 may be tilted so that the plane mentioned above intersects the optical element 10 at an angle other than a right angle. In this case, no zeroth-order diffracted light emerges from the optical element 10 in the direction of the line of sight of the observer OB. Thus, the observer cannot observe the zeroth-order diffracted light emerging from the optical element 10. In other words, the observer cannot observe the color exhibited by the optical element 10.

In the optical element 10, colors due to the first and second subwavelength gratings 11G1 and 11G2 synchronously appear and disappear in the respective subwavelength gratings. Thus, the entire optical element 10 is switched between a colored state and a monochromatic state. Therefore, in authenticity verification of the optical element 10, it can be determined at once whether the optical element 10 includes the first region 11S1 exhibiting the color derived from the first subwavelength gratings 11G1, and the second region 11S2 exhibiting the color derived from the second subwavelength grating 11G2. As a result, authenticity verification of the optical element 10 is facilitated even more compared to the case of determining whether the optical element 10 has a state of exhibiting two colors by rotating the optical element 10.

Figure 6:
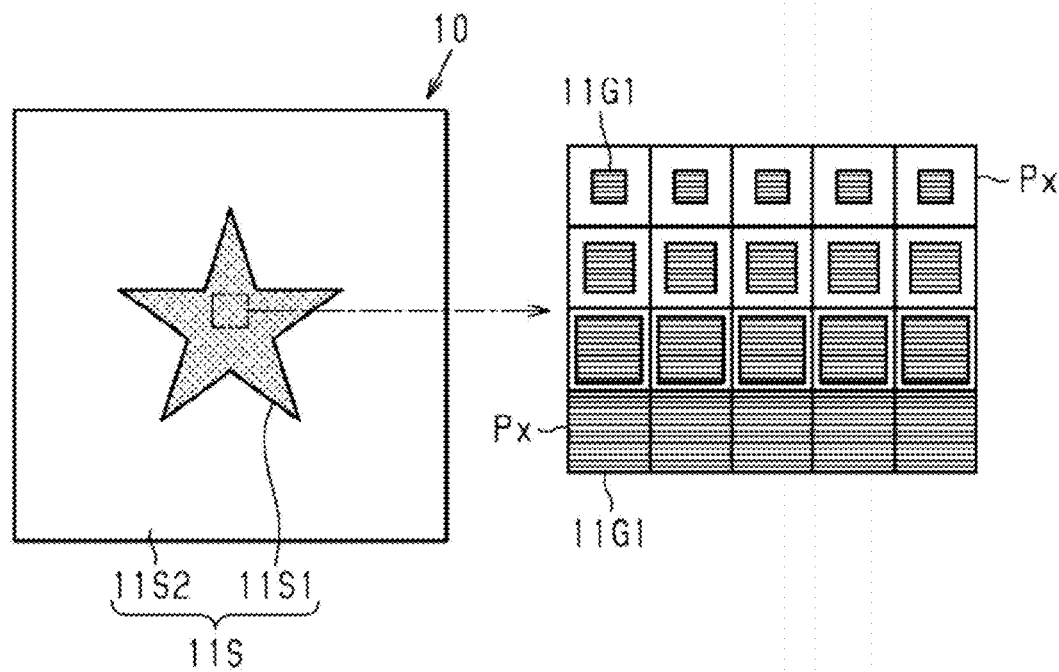
FIG. 6 is a set of a schematic plan view and an enlarged view thereof, illustrating a structure of another example of the first embodiment of the present invention.

FIG. 6 shows another example of the optical element 10 according to the present embodiment. As in FIG. 2, FIG. 6 shows a structure of the optical element 10 as viewed perpendicular to the observation surface 10S.

As shown in FIG. 6, the pixel regions Px may include those pixel regions Px which each include the first subwavelength grating 11G1 at a part thereof as viewed perpendicular to the surface 11S. In the example described earlier referring to FIG. 3, the first subwavelength grating 11G1 is provided across each pixel region Px. Without being limited to this, in each pixel region Px, the first subwavelength grating 11G1 may be located at a part thereof. In each pixel region Px, the ratio of the area of the first subwavelength grating 11G1 to the area of the pixel region Px is an area ratio. The pixel regions Px may include those pixel regions Px which have area ratios different from each other.

As the area ratio of each pixel region Px increases, the brightness of the pixel region Px increases accordingly. Thus, when the pixel regions Px include those pixel regions Px which have different area ratios, the color exhibited by the first region 11S1 can present brightness-based shades of the same hue. The shades may change continuously. The shades may be gradation. This enables display of a pseudo-three-dimensional image on the first region 11S1. In this case, the area ratio may be determined according to the brightness level, i.e., the gradient, of the three-dimensional image that should be displayed on the first region 11S1.

In the present embodiment, the first region 11S1 of the optical element 10 includes pixel regions Px where the area ratio decreases from the center toward the outer edge thereof and is minimized at the outer edge thereof.

The optical element 10 of the present embodiment may have a configuration described below referring to FIGS. 7 to 11. Prior to describing another example of the optical element 10, the azimuth angle of the subwavelength grating described above will be more specifically described.

Figure 7:
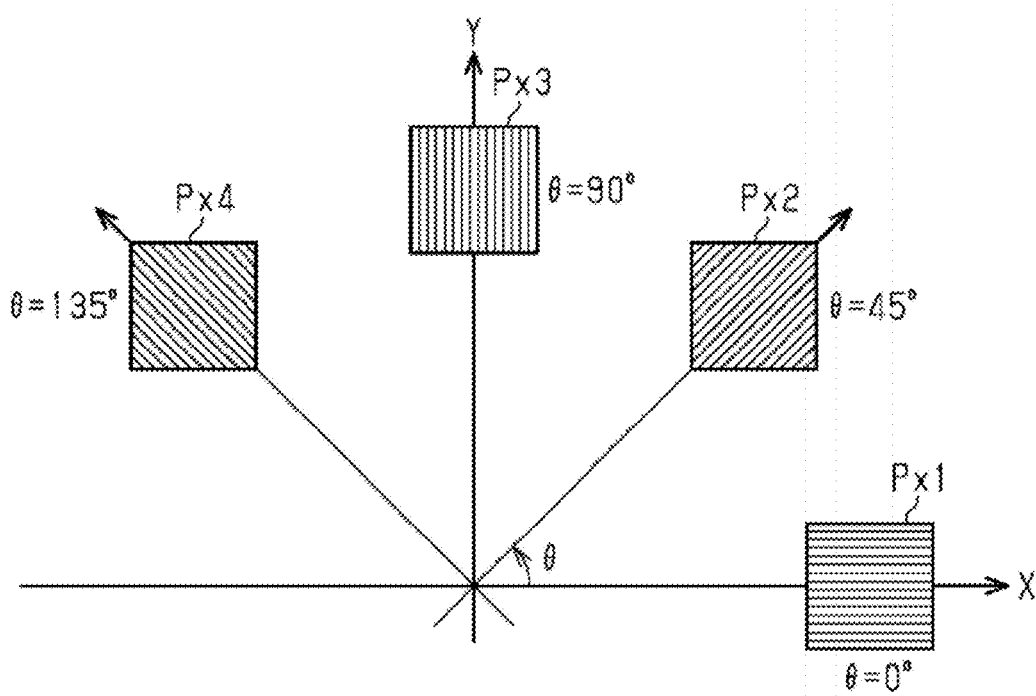
FIG. 7 is a schematic diagram illustrating azimuth angles of pixel regions.

As shown in FIG. 7, an arbitrary direction parallel to the observation surface 10S of the optical element 10 is an X direction, and the direction orthogonal to the X direction is a Y direction. In the present embodiment, the X direction is a reference direction of an azimuth angle, and the angle between the X direction and the direction in which the grating patterns extend is an azimuth angle θ. Thus, the azimuth angle θ in a first pixel region Px1 is 0°, and the azimuth angle θ in a second pixel region Px2 is 45°. The azimuth angle θ in a third pixel region Px3 is 90°, and the azimuth angle θ in a fourth pixel region Px4 is 135°.

Figure 8:
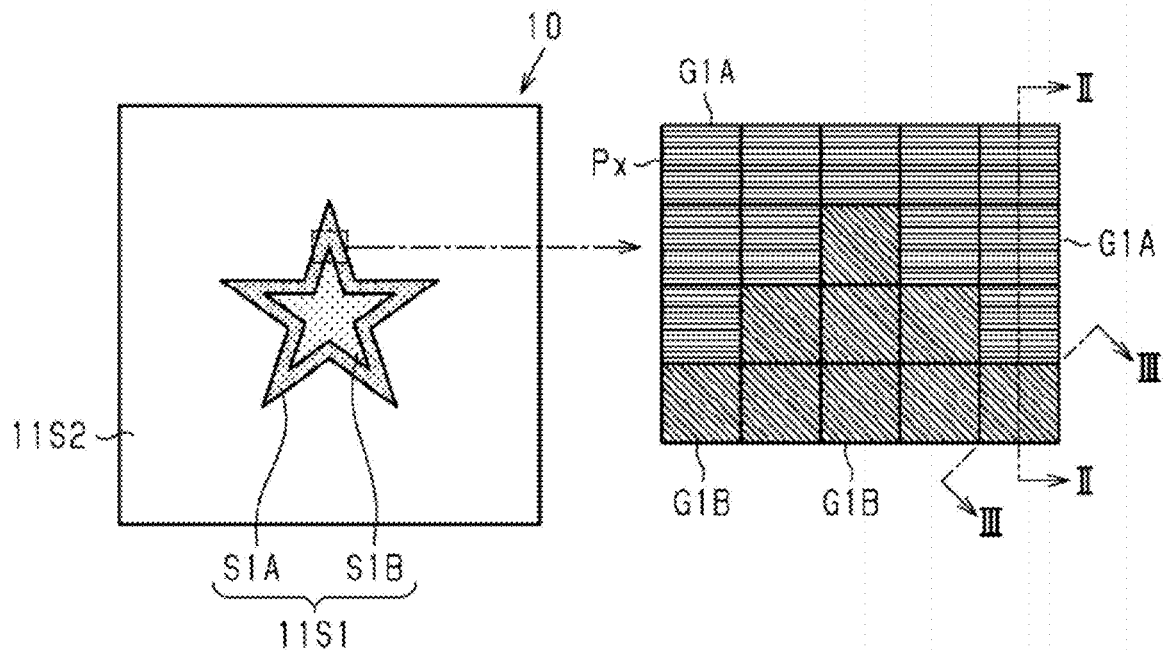
FIG. 8 is a set of a schematic plan view and an enlarged view thereof, illustrating a structure of still another example of the first embodiment of the present invention.

As in FIG. 2, FIG. 8 shows a set of diagrams each illustrating a structure of the optical element 10 as viewed perpendicular to the observation surface 10S.

As shown in FIG. 8, the first region 11S1 includes a first element S1A and a second element S1B that is adjacent to the first element S1A. The elements S1A and S1B each are shaped conforming to the contour of the first region 11S1 as viewed perpendicular to the surface 11S of the first layer 11. In the present embodiment, the first region 11S1 is formed by the first and second elements S1A and S1B, and the first element S1A is located outside the second element S1B. The contour of the first element S1A and the contour of the second element S1B are similar to the contour of the first region 11S1.

In the first subwavelength grating 11G1, the subwavelength grating belonging to the first element S1A corresponds to a first grating G1A. In the first subwavelength grating 11G1, the subwavelength grating belonging to the second element S1B corresponds to a second grating G1B. The first and second gratings G1A and G1B have an equal grating period. The first and second gratings G1A and G1B have respective azimuth angles θ different from each other and the difference is 90° or less. In the present embodiment, the azimuth angle θ in the first grating G1A is 0°, and the azimuth angle θ in the second grating G1B is 45°. Accordingly, the difference in azimuth angle θ between the first and second gratings G1A and G1B is 45°.

Figure 9:
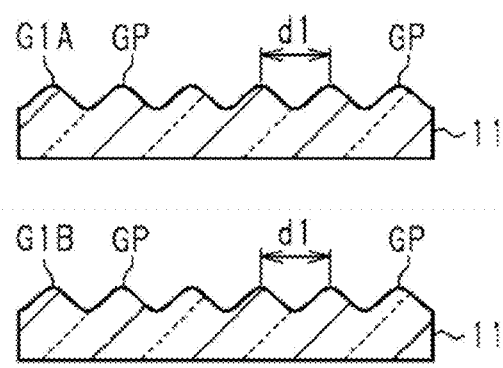
FIG. 9 is a set of schematic cross-sectional views respectively illustrating the structures taken along the lines II-II and of FIG. 8.

FIG. 9 is a set of diagrams respectively illustrating cross-sectional structures of the first grating G1A taken along the line II-II of FIG. 8 and the second grating G1B taken along the line II-II thereof. In FIG. 9, for convenience of illustration, the cross-sectional structures of the first and second gratings G1A and G1B are vertically arranged as viewed in the drawing. The cross-sectional structure of each grating schematically shows the cross-sectional structure of the subwavelength grating located in one pixel region Px. In FIG. 9, as in FIG. 3, for convenience of illustration, each subwavelength grating is shown as a surface configuring convexities projected in a direction away from the flat surface.

As shown in FIG. 9, the grating periods of the first and second gratings G1A and G1B are equal to each other. Specifically, the grating period of the first grating G1A is the first period d1, and that of the second grating G1B is also the first period d1. As mentioned above, the distance between two adjacent grating patterns GP is the grating period of the grating.

Figure 10:
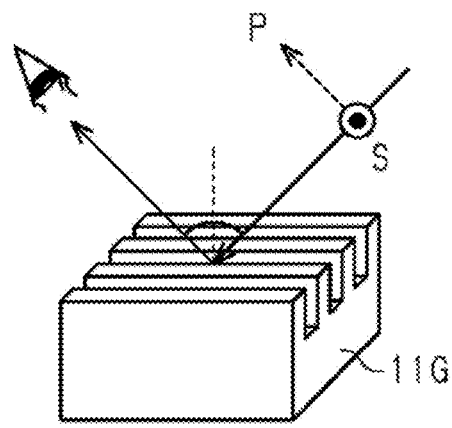
FIG. 10 is a schematic diagram illustrating a relationship between an azimuth angle and a wavelength of light emerging from a subwavelength grating.
Figure 11:
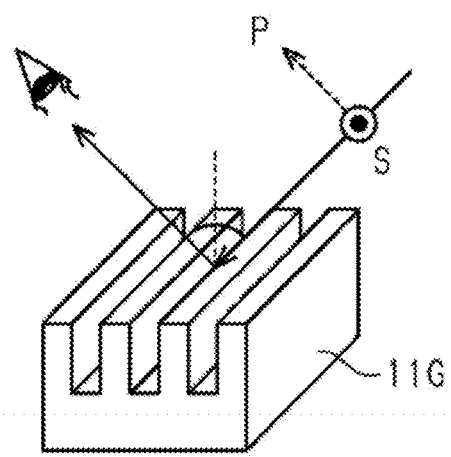
FIG. 11 is a schematic diagram illustrating a relationship between an azimuth angle and a wavelength of light emerging from a subwavelength grating.

Two subwavelength gratings having the same grating period and the same azimuth angle θ exhibit the same color. Two subwavelength gratings having the same grating period but different azimuth angles θ exhibit colors different from each other. Specifically, the color exhibited by the first grating G1A and the color exhibited by the second grating G1B under a specific observation condition are different from each other. Referring to FIGS. 10 and 11, the reason why the colors exhibited by the first and second gratings G1A and G1B are different from each other will be described.

FIG. 10 shows a perspective structure of the subwavelength grating 11G where the azimuth angle θ is 0°. FIG. 11 shows a perspective structure of the subwavelength grating 11G where the azimuth angle θ is 90°. Among the polarized components contained in the light incident on the subwavelength grating 11G, the polarized light having the electric field oscillating perpendicular to the incidence plane of the subwavelength grating 11G is s-polarized light. Also, the polarized light having the electric field oscillating parallel to the incidence plane of the subwavelength grating 11G is p-polarized light. The incidence plane refers to a plane perpendicular to the plane in which the subwavelength grating is disposed, and including the incident light and the reflected light. Neither of the s-polarized light and the p-polarized light depends on the azimuth angle θ of the subwavelength grating 11G. In other words, the light, whether it is incident on the subwavelength grating 11G shown in FIG. 10 or the subwavelength grating 11G shown in FIG. 11, contains the s-polarized light and the p-polarized light.

In a structure including troughs as the diffraction grating does, the relationship between the wavelength of light and the diffraction efficiency of the wavelength depends on the relationship between the direction in which the troughs extend, i.e., the azimuth angle θ, and the oscillation direction of the electric field. In the light incident on the diffraction grating, the component having the electric field oscillating in a direction parallel to the azimuth angle θ of the diffraction grating is a transverse electric (TE) wave. In the light incident on the diffraction grating, the component having the electric field oscillating in a direction orthogonal to the azimuth angle θ of the diffraction grating is a transverse magnetic (TM) wave. As mentioned earlier referring to FIG. 10, in a diffraction grating having an azimuth angle θ of 0°, the p-polarized light, i.e., the component having the electric field oscillating in a direction parallel to the azimuth angle θ of the diffraction grating, is equal to the TE wave. Also, as mentioned earlier referring to FIG. 11, in a diffraction grating having an azimuth angle θ of 90°, the p-polarized light, i.e., the component having the electric field oscillating in a direction orthogonal to the azimuth angle θ of the diffraction grating, is equal to the TM wave.

It is known that when light is incident on the interface between a diffraction grating and a medium surrounding the diffraction grating, the reflectance depends on the polarization direction of the light incident on the incidence plane. Furthermore, it is known that, in a diffraction grating, there is a difference in diffraction efficiency between the TE wave and the TM wave at the wavelength included in the incident light. Thus, the wavelength distribution of the light emerging from the diffraction grating as the zeroth-order diffracted light depends on whether the s-polarized light and the p-polarized light each correspond to the TE wave or the TM wave. For this reason, the color exhibited by the subwavelength grating 11G shown in FIG. 10 is different from the color exhibited by the subwavelength grating 11G shown in FIG. 11. The color exhibited by the subwavelength grating 11G shown in FIG. 10 may be a first color, and the color exhibited by the subwavelength grating 11G shown in FIG. 11 may be a second color. The second color differs from the first color.

The optical element 10 described earlier referring to FIG. 8 can include the subwavelength grating 11G shown in FIG. 10 as the first gratings G1A, and the subwavelength grating 11G shown in FIG. 11 as the second gratings G1B. In this case, the state where the first element S1A including the first grating G1A exhibits the first color and the second element S1B including the second grating G1B exhibits the second color corresponds to an initial placement where the optical element 10, the observer and the light source are relatively positioned. When the optical element 10 is rotated by 90° from the initial placement about the line normal to the optical element 10 as a rotational axis, the s-polarized light corresponds to the TE wave and the p-polarized light corresponds to the TM wave in the first grating G1A. In contrast, in the second grating G1B, the s-polarized light corresponds to the TM wave and the p-polarized light corresponds to the TE wave. Thus, the first element S1A exhibits the second color, and the second element S1B exhibits the first color. Therefore, the observer recognizes that the color exhibited by the first element S1A and the color exhibited by the second element S1B are reversed due to the rotation of the optical element 10.

In this manner, the refractive index of the optical element 10 as viewed in the direction of light changes between the light incident on the subwavelength grating 11G from the direction in which the grating lines of the subwavelength grating 11G extend and the light incident thereon from the direction orthogonal to the direction in which the grating lines extend. Therefore, light having different wavelengths emerges from the subwavelength grating 11G.

As described above, the difference between the azimuth angle θ of the first grating G1A and the azimuth angle θ of the second grating G1B is preferred to be 90° or less. The reasons are as follows. The angle between the observation surface 10S of the optical element 10 and the plane including the line of sight of the observer is an observation angle. The observation angle of observing the color exhibited by the subwavelength grating is affected by only the positional relationship between the light source, the observer and the optical element 10. Thus, even if the azimuth angle θ is different between the first and second gratings G1A and G1B, the observation angles of observing the colors respectively exhibited by the first and second gratings G1A and G1B are equal to each other. In other words, the observation angle at which the color exhibited by the grating G1A or G1B appears is equal to the observation angle at which the color exhibited by the grating G1A or G1B disappears.

If the difference in azimuth angle θ between the first and second gratings G1A and G1B is 90°, the wavelength of the zeroth-order diffracted light emerging from the first gratings G1A is different from the wavelength of the zeroth-order diffracted light emerging from the second gratings G1B. Thus, the first color exhibited by the first gratings G1A is different from the second color exhibited by the second gratings G1B. If the difference in azimuth angle θ between the first and second gratings G1A and G1B is set to an angle in the range of more than 0° and less than 90°, the first grating G1A and/or second grating G1B exhibit a color intermediate between the first and second colors. The colors respectively exhibited by the first and second gratings G1A and G1B depend on the difference in azimuth angle θ. Thus, in the pixel regions Px arranged in one direction, the colors exhibited by the respective pixel regions Px can be gradually changed, or, in the pixel regions Px adjacent to each other, the colors respectively exhibited by the pixel regions Px can be sharply changed, depending on the difference in azimuth angle θ between the first and second gratings G1A and G1B.

In the subwavelength grating 11G, when the difference in azimuth angle θ between the first and second gratings G1A and G1B is set to 90°, the difference in wavelength between the light emerging from the first grating G1A and the light emerging from the second grating G1B is maximized. However, if the difference in azimuth angle θ between the first and second gratings G1A and G1B is set to more than 90°, the difference in wavelength between the light emerging from the first grating G1A and the light emerging from the second gratings G1B does not increase.

Furthermore, as the difference in azimuth angle θ between the first and second gratings G1A and G1B decreases, the first grating G1A is less likely to be different from the second grating G1B in terms of configuration accuracy. Therefore, the maximum difference in azimuth angle θ between the first and second gratings G1A and G1B is preferred to be 90°.

As described above, according to the first embodiment of the optical element, the following advantageous effects can be achieved.

(1) In authenticity verification of the optical element 10, it can be determined at once whether the optical element 10 includes the first region 11S1 exhibiting the color derived from the first subwavelength gratings 11G1 and the second region 11S2 exhibiting the color derived from the second subwavelength gratings 11G2. As a result, authenticity verification of the optical element 10 is facilitated even more compared to the case of determining whether the optical element 10 has a state of exhibiting two colors by rotating the optical element 10.

(2) As the area ratio of each pixel region Px increases, the brightness of the pixel region Px increases accordingly. Thus, when the pixel regions Px include those pixel regions Px which have different area ratios, the color exhibited by the first region 11S1 can present brightness-based shades of the same hue.

(3) Since the azimuth angle θ is different between the first and second gratings G1A and G1B, the colors respectively exhibited by the first and second gratings G1A and G1B are different from each other.

[Modification of First Embodiment]

The first embodiment of the present invention described above may be appropriately modified and implemented as follows.

[Grating Period]

The azimuth angles θ of the first and second gratings G1A and G1B may be equal to each other, and the grating periods of the first and second gratings G1A and G1B may be different from each other. In this case, the following advantageous effects can be achieved.

(4) Due to the grating periods of the first and second gratings G1A and G1B being different from each other, the color exhibited by the first grating G1A is different from the color exhibited by the second grating G1B.

Colors that can be exhibited by the first grating G1A and colors that can be exhibited by the second grating G1B are increased by using different grating periods between the first and second gratings G1A and G1B, compared to using different azimuth angles θ therebetween. This enhances the flexibility of colors presented by the optical element 10.

The azimuth angles θ of the first and second gratings G1A and G1B may be different from each other, and the grating periods of the first and second gratings G1A and G1B may be different from each other.

Second Embodiment

Figure 12:
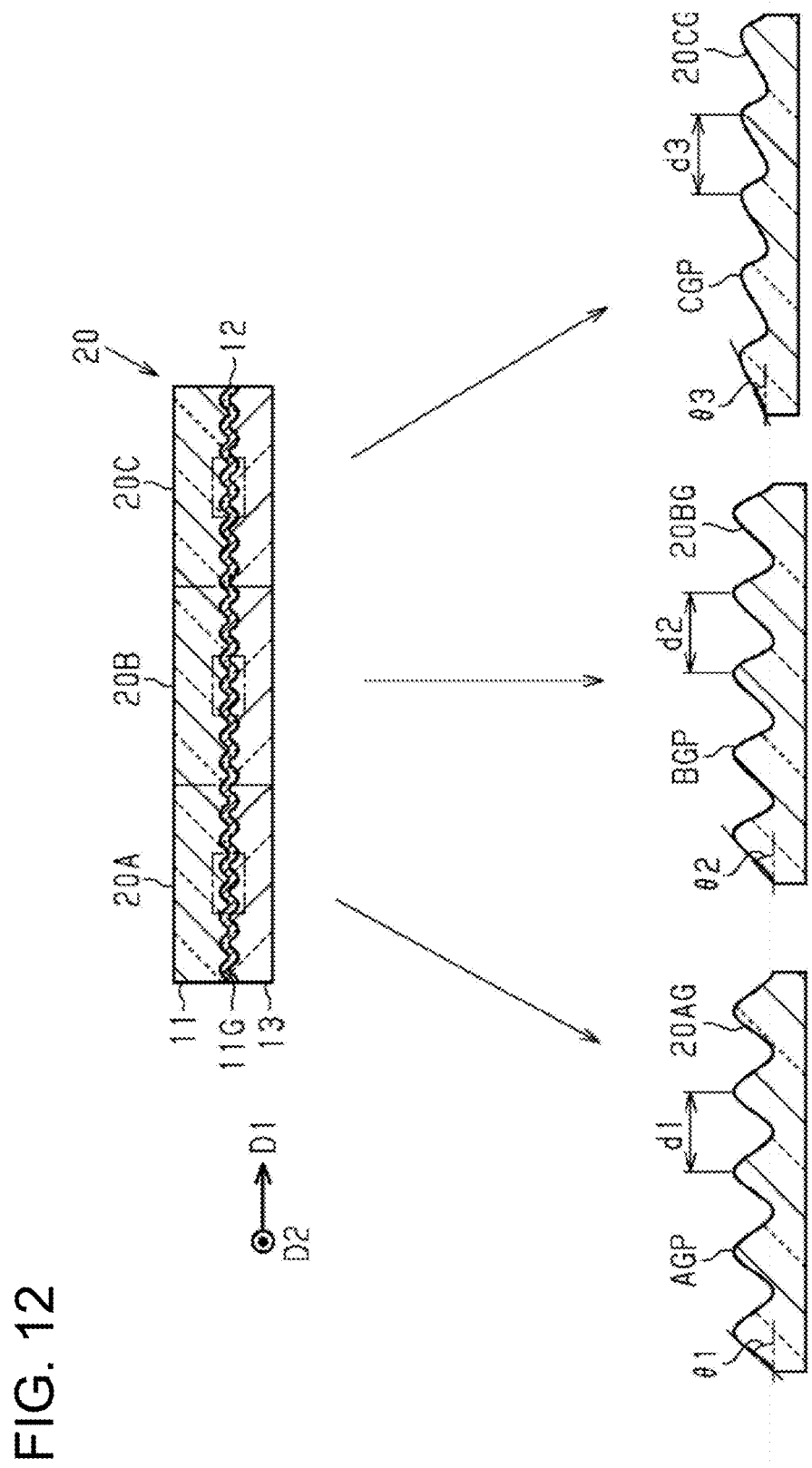
FIG. 12 is a set of schematic cross-sectional views, including enlarged views, illustrating a structure of an optical element according to a second embodiment of the present invention.
Figure 13:
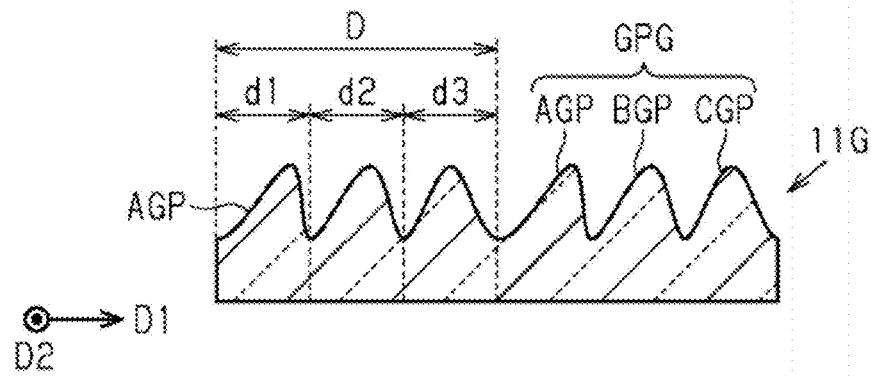
FIG. 13 is a schematic cross-sectional view illustrating a structure of another example of the optical element according to the second embodiment of the present invention.
Figure 14:
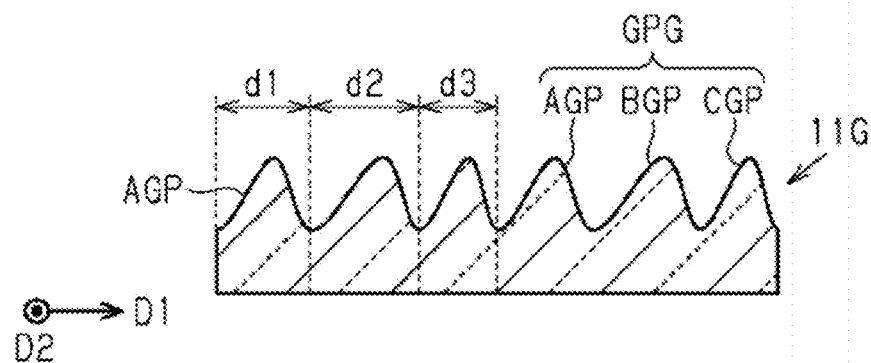
FIG. 14 is a schematic cross-sectional view illustrating a structure of still another example of the optical element according to the second embodiment of the present invention.

Referring to FIGS. 12 to 14, a second embodiment of the optical element will be described. The optical element according to the second embodiment of the present invention is different from the optical element of the first embodiment in the configuration of the grating patterns in the subwavelength grating. While the differences will be specifically described below, the components of the optical element of the second embodiment corresponding to those of the optical element of the first embodiment are given the same reference signs to omit duplicate description. In FIG. 12 to FIG. 14, for convenience of illustration, the subwavelength grating is shown as a structure where convexities are arranged being projected in a direction away from the flat surface. In the optical element of the second embodiment, the color of the subwavelength grating observed by the observer may be based on diffracted light of higher order than the zeroth-order diffracted light. Thus, in the following, the angle at which the subwavelength grating produces color most efficiently is referred to as an m-th order angle, and the diffracted light at the m-th order angle is referred to as m-th order diffracted light.

As mentioned above, the subwavelength grating 11G includes a plurality of grating patterns. The direction in which the grating pattern is repeated is a first direction D1, and the direction orthogonal to the first direction D1 is a second direction D2. In the grating patterns, the configuration in a cross section parallel to the first direction D1 and perpendicular to the plane in which the first layer 11 is disposed is referred to as a cross-sectional configuration. The grating patterns have a continuous cross-sectional configuration in the second direction D2. The grating patterns include those grating patterns which have a differently shaped cross-sectional configuration. The optical element of the present embodiment will be more specifically described below.

FIG. 12 shows an optical element 20 including, as does the optical element 10 of the first embodiment, a first layer 11, a second layer 12 and a third layer 13. The optical element 20 includes three sections in the first direction D1. Specifically, the optical element 20 includes a first section 20A, a second section 20B and a third section 20C. The first, second and third sections 20A, 20B and 20C are arranged in this order in the direction in which the grating pattern is repeated.

In the subwavelength grating 11G, the grating patterns within each section have one uniform cross-sectional configuration. Specifically, the cross-sectional configuration is different between these sections. The subwavelength grating 11G which belongs to the first section 20A is a first grating 20AG, that which belongs to the second section 20B is a second grating 20BG, and that which belongs to the third section 20C is a third grating 20CG.

The first grating 20AG includes a plurality of first grating patterns AGP. The plurality of first grating patterns AGP are arranged in the first direction D1. The first grating 20AG has a wave-shaped cross-sectional configuration. The grating period of the first grating 20AG is a first period d1. The first grating patterns AGP have a configuration in which one crest is sandwiched between two troughs in a cross section parallel to the first direction D1. Each first grating pattern AGP has a first slope connecting one trough to a crest and a second slope connecting the crest to another trough. Each slope is inclined relative to the plane in which the first layer 11 is disposed.

In a cross section parallel to the first direction D1, the angle between a tangent line to the first slope and a straight line connecting the troughs is a first tangent angle $\theta 1$. The straight line connecting the troughs is substantially parallel to the surface of the first layer 11. The first tangent angle $\theta 1$ is equal to the angle between the plane in which the first layer 11 is disposed and the first slope.

The second grating 20BG includes a plurality of second grating patterns BGP. The plurality of second grating pattern BGP are arranged in the first direction D1. The second grating 20BG has a wave-shaped cross-sectional configuration. The grating period of the first grating 20AG is a second period d2. The second period d2 is equal to the first period d1. Similarly to the first grating patterns AGP, the second grating patterns BGP have a configuration in which one crest is sandwiched between two troughs in a cross section parallel to the first direction D1. Each second grating pattern BGP has a first slope connecting one trough to a crest and a second slope connecting the crest to another trough. Each slope is inclined relative to the plane in which the first layer 11 is disposed.

In a cross-section parallel to the first direction D1, the angle between a tangent line to the first slope and a straight line connecting the troughs is a second tangent angle $\theta 2$. The second tangent angle $\theta 2$ differs from the first tangent angle $\theta 1$. The second tangent angle $\theta 2$ is equal to the angle between the plane in which the first layer 11 is disposed and the first slope. In the present embodiment, the second tangent angle $\theta 2$ is smaller than the first tangent angle $\theta 1$. As mentioned above, the second period d2 of the second grating 20BG is equal to the first grating period d1 of the first grating 20AG. Thus, in a cross-section parallel to the first direction D1, the cross-sectional configuration of the second grating patterns BGP differs from that of the first grating patterns AGP.

The third grating 20CG includes a plurality of third grating patterns CGP. The plurality of third grating pattern CGP are arranged in the first direction D1. The third grating 20CG has a wave-shaped cross-sectional configuration. The grating period of the third grating 20CG is a third period d3. The third period d3 is equal to the first and second periods d1 and d2. Similarly to the first grating patterns AGP, the third grating patterns CGP have a configuration in which one crest is sandwiched between two troughs in a cross section parallel to the first direction D1. Each third grating pattern CGP has a first slope connecting one trough to a crest and a second slope connecting the crest to another trough. Each slope is inclined relative to the plane in which the first layer 11 is disposed.

In a cross-section parallel to the first direction D1, the angle between a tangent line to the first slope and a straight line connecting the troughs is a third tangent angle θ3. The third tangent angle θ3 differs from the first tangent angle θ1 and also differs from the second tangent angle θ2. The third tangent angle θ3 is equal to the angle between the plane in which the first layer 11 is disposed and the first slope. In the present embodiment, the third tangent angle θ3 is smaller than the first tangent angle θ1 and also smaller than the second tangent angle θ2. As mentioned above, the third period d3 of the third grating 20CG is equal to the first period d1 and the second period d2. Thus, in a cross-section parallel to the first direction D1, the cross-sectional configuration of the third grating patterns CGP differs from those of the first and second grating patterns AGP and BGP.

Specifically, in the present embodiment, the above cross-sectional configurations of the grating patterns respectively include first slopes inclined relative to the plane in which the first layer 11 is disposed. The grating patterns include those grating patterns having first slopes differently inclined relative to the first layer 11.

According to such a subwavelength grating 11G, the angle at which the light incident on the optical element 20 is diffracted can be changed by changing the tangent angles θ1, θ2, and θ3 of the first slopes. Specifically, the angles at which the m-th order diffracted light emerges from the gratings 20AG, 20BG and 20CG can be varied by varying the tangent angles θ1, θ2 and θ3 between these gratings. Thus, compared to the case in which the same tangent angle is used across the subwavelength grating 11G, the range of emergence angle of the m-th order diffracted light is broadened. In other words, the angular range in which the observer can observe the m-th order diffracted light is broadened. The gratings 20AG, 20BG and 20CG, which are different in cross-sectional configuration but are equal in grating period, exhibit substantially the same color. For this reason, the mass of m-th order diffracted light emerging from the gratings 20AG, 20BG and 20CG does not produce monochromatic light.

The gratings 20AG, 20BG and 20CG are each preferred to have a width of 300 μm or less, and more preferably 85 μm or less, in the first direction D1. The gratings 20AG, 20BG and 20CG, if they each have a width of 300 μm or less, cannot be resolved with the resolution of the human eye. Thus, the observer cannot recognize the gratings 20AG, 20BG and 20CG diffracting light at angles which are different from each other.

The gratings 20AG, 20BG and 20CG are each more preferred to have a width of 85 μm or less for the following reasons. In general, it is known that a person with a visual acuity of 1.0 can resolve a gap of 1.454 mm at a position 5 m away from an object to be observed with a visual angle of one minute. This is explained using a Landolt ring. One minute is 1/60 of 1°. Assuming that an observer observes the optical element 20 at a position 30 cm away therefrom, a gap that can be resolved by the observer's eye, i.e., resolution R, is derived from the following Formula (4).

$$R=1454\times(30/500)(\mu m) \qquad \text{Formula (4)}$$

On the right side of Formula (4), the unit of the first item is μm and the unit of the second item is cm. According to Formula (4), the resolution R is 87.24 μm. Thus, if the gratings 20AG, 20BG and 20CG each have a width of 85 μm or less, the probability of the human eye being unable to resolve these gratings is increased.

The fact that the grating patterns AGP, BGP and CGP each have a wave-shaped cross-sectional configuration with a different tangent angle is preferred from the perspective that the direction in which the m-th order diffracted light emerges can be controlled according to the tangent angles. In contrast, if each cross-sectional configuration of the grating patterns is rectangular as defined by a plane parallel to the front surface of the optical element 20 and planes orthogonal to the front surface, the m-th order diffracted light, i.e., the zeroth-order diffracted light, emerges in a specular reflection direction of the incident light. For example, if the angle of light incident on the surface of the optical element 20 is 45°, the emergence angle of the specular reflection light is also 45°. Therefore, the observer cannot observe the light emerging from the optical element 20 unless the observer observes the optical element 20 in a direction where the observation angle is 45°.

When the optical element 20 is observed at the emergence angle of specular reflection light, the specular reflection light of the light emitted from the light source toward the optical element 20 is also observed by the observer. This may hinder the observer from observing the light emerging from the subwavelength grating. Furthermore, depending on the position of the light source relative to the optical element 20, it may be difficult to observe the optical element 20 from the angle of the specular reflection. In this respect, being able to control the emergence directions of the m-th order diffracted light according to the tangent angles, flexibility in the angle of the m-th order diffracted light emerging from the optical element 20 is increased. Thus, the issues set forth above may also be solved.

The subwavelength grating 11G including the three types of grating patterns may have the following structure.

As shown in FIG. 13, the subwavelength grating 11G includes first grating patterns AGP, second grating patterns BGP and third grating patterns CGP. In the subwavelength grating 11G, one first grating pattern AGP, one second grating pattern BGP and one third grating pattern CGP form one pattern group GPG. In one pattern group GPG, the first, second and third grating patterns AGP, BGP and CGP are arranged in this order in the first direction D1. In the subwavelength grating 11G, a plurality of pattern groups GPG are arranged in the first direction D1.

In the first direction D1, the first grating patterns AGP have a grating period corresponding to a first period d1, the second grating patterns BGP have a grating period corresponding to a second period d2, and the third grating patterns CGP have a grating period corresponding to a third period d3. The first, second and third periods d1, d2 and d3 are equal to each other.

The pattern groups GPG are preferred to have a period D of 20 μm or more in the first direction D1. As the period D of the pattern group GPG increases, higher-order diffracted light is included in a single observable angular range. In other words, as the period D of the pattern group GPG increases, the observation angular range including the same-order diffracted light is narrowed accordingly. Thus, by reducing the difference in observation angle between the m-th order diffracted light and other diffracted light, the observer can observe various types of diffracted light simultaneously with the m-th order diffracted light. This broadens the observation angular range in which the observer can observe the light emerging from the optical element 20.

For example, as described above, in a diffraction grating having a rectangular cross-sectional configuration, the following Formula (5) is established, where the angle between incident light and normal line to the diffraction grating is α, and the angle between diffracted light and normal line to the diffraction grating is β The angle α is an incidence angle, and the angle θ is a diffraction angle.

$$d(\sin\alpha+\sin\beta)=m\lambda \qquad \text{Formula (5)}$$

In Formula (5), d is a period of the diffraction grating, m is a diffraction order, and λ is a wavelength of light. The units of the period and the wavelength are both nm. In the subwavelength grating 11G shown in FIG. 13, the period d corresponds to the period D of the pattern group GPG mentioned above. In Formula (5), when the angle α is 45°, the wavelength λ is 500 nm, and the period d is 5,000 nm, diffraction orders m and angles β are as follows.

$$(m,\beta)=(1,-37.4),(2,-30.5),(3,-24.0)\ldots$$

When the period d is changed to 10,000 nm, diffraction orders m and angles β are as follows.

$$(m,\beta)=(1,-41.1),(2,-37.4),(3,-33.9)\ldots$$

When the period d is changed to 20,000 nm, diffraction orders m and angles β are as follows.

$$(m,\beta)=(1,-43.0),(2,-41.1),(3,-39.2)\ldots$$

In this manner, as the period d increases, the difference in angle β decreases accordingly between types of diffracted light having different diffraction orders.

Let us assume that the human eye has a pupil diameter of 5 mm, and the observer observes the optical element 20 from a distance of 30 cm. In this case, of the types of light emerging from a specific point of the optical element 20, light included in the observation angle of about 1° enters the observer's eye. Specifically, the observer observes light integrated in an observation angle of about 1°. More specifically, if diffracted light having the wavelength within the observation angular range of about 1° is included in this observation angular range, the diffraction efficiency is increased in this range. Furthermore, when the observer observes the optical element 20 while tilting the optical element 20 to change the observation angle, and if the color exhibited by the optical element 20 is maintained to a specific color while the observer changes the observation angle by 2° or more, the observer can easily recognize the color exhibited by the optical element 20. For this reason, it is preferred that the optical element 20 is configured such that at least two types of diffracted light of different orders emerge in an observation angular range of 2°. In this respect, the period D of the optical element 20 is preferred to be 20 μm or more.

The subwavelength grating 11G including the three types of grating patterns may have the following structure.

As shown in FIG. 14, the subwavelength grating 11G may include first grating patterns AGP, second grating patterns BGP and third grating patterns CGP. In the subwavelength grating 11G, one first grating pattern AGP, one second grating pattern BGP and one third grating pattern CGP form one pattern group GPG. In one pattern group GPG, the first, second and third grating patterns AGP, BGP and CGP are arranged in this order in the first direction D1. In the subwavelength grating 11G, a plurality of pattern groups GPG are arranged in the first direction D1.

The first grating patterns AGP have a grating period corresponding to a first period d1, the second grating patterns BGP have a grating period corresponding to a second period d2, and the third grating patterns CGP have a grating period corresponding to a third period d3. The first, second and third periods d1, d2 and d3 are different from each other. The difference in grating period is preferred to be 20 nm or less between the grating patterns adjacent to each other in the first direction D1. For example, the first period d1 may be set to 300 nm, the second period d2 may be set to 310 nm, and the third period d3 may be set to 290 nm.

Since the grating period differs between the grating patterns, the diffraction angle differs therebetween. As the difference in grating period decreases between the grating patterns, the difference in diffraction angle decreases therebetween accordingly. As mentioned above, if the difference in grating period is 20 nm or less between the grating patterns adjacent to each other in the first direction D1, the diffraction angles of the m-th order diffracted light emerging from the grating patterns are substantially equal to each other. Thus, the observer cannot resolve the m-th order diffracted light emerging from the grating patterns. Consequently, the observation angle at which the observer can observe the light emerging from the optical element 20 is broadened.

As described above, the optical element according to the second embodiment achieves the following advantageous effects.

(5) The observation angle at which the observer can observe the light emerging from the subwavelength grating 11G is broadened, compared to the case in which a plurality of grating patterns have one uniform cross-sectional configuration along the first direction D1.

(6) The observation angle at which the observer can observe the light emerging from the subwavelength grating 11G is broadened according to the difference in inclination between the grating patterns, compared to the case in which a plurality of grating patterns have the first slopes of the same inclination in the cross-sectional configuration along the first direction D1.

[Modification of Second Embodiment]

The second embodiment described above may be appropriately modified and implemented as follows.

[Cross-Sectional Configuration]

The subwavelength grating 11G may include four or more types of grating patterns which are different in the above cross-sectional configuration. Several types of grating patterns may be randomly arranged in the subwavelength grating 11G. Alternatively, several types of grating patterns may be regularly arranged.

The cross-sectional configuration of the subwavelength grating 11G is not limited to the configuration described above. If the subwavelength grating 11G has a configuration other than a wave-shaped configuration, as long as the subwavelength grating 11G includes several types of grating patterns which are different in cross-sectional configuration, the advantageous effect comparable to the above item (5) can be achieved.

Third Embodiment

Figure 15:
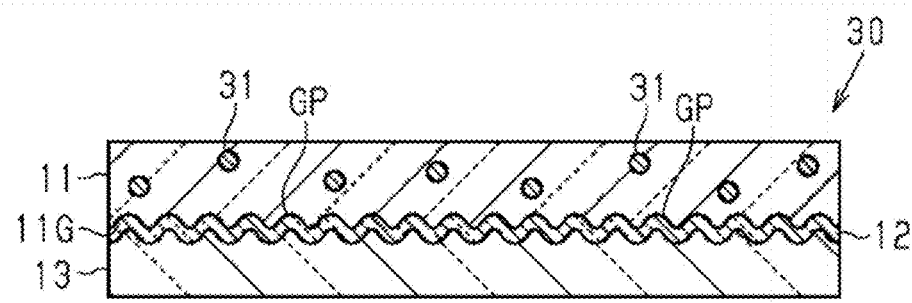
FIG. 15 is a schematic cross-sectional view illustrating a structure of an optical element according to a third embodiment of the present invention.

Referring to FIG. 15, an optical element according to a third embodiment will be described. The optical element according to the third embodiment of the present invention is different from the optical element 10 of the first embodiment in that the first layer includes a filler. While the differences will be specifically described below, the components of the optical element of the third embodiment corresponding to those of the optical element of the first embodiment are given the same reference signs to omit duplicate description.

FIG. 15 shows an optical element 30 including a first layer 11 made a resin in which a filler 31 is dispersed. The filler 31 has an average particle size of 400 nm or less. At least part of the light incident on the first layer 11 is scattered by the filler dispersed in the first layer 11. Therefore, the light incident on the subwavelength grating 11G includes light having incidence angles different from each other. Thus, grating patterns GP in the subwavelength grating 11G reflect light in respective specular reflection directions corresponding to the angles of light incident on the grating patterns GP. The light reflected by the grating patterns GP is emitted outside the optical element 30 without being scattered by the filler 31 or after being scattered by the filler 31. Thus, compared to the case in which the first layer 11 contains no filler, the angular range of light emerging from the optical element 30 is broadened. As a result, the observation angular range in which the observer can observe the color exhibited by the optical element 30 is broadened.

As described above, the average particle size of the filler 31 is preferred to be 400 nm or less. This can minimize the occurrence of Mie scattering, and thus may increase the transparency of the first layer 11. Particles of the filler 31 are not limited to have a spherical shape. Therefore, in the present embodiment, an average of several particle sizes that can be defined in the particles of the filler 31 is an average particle size of the filler 31. The following are known regarding the relationship between the size of a scatterer, such as the filler 31, and a scattering phenomenon. If the average particle size of the scatterer is in the range of 400 nm or more and 700 nm or less, the scatterer may cause Mie scattering. In Mie scattering, since the light in the visible range is scattered to the same extent regardless of the wavelength of light, the light scattered by Mie scattering is observed as white light. In Mie scattering, the scattering angle of light is affected by the particle size of the scatterer. In Mie scattering, the greater the particle size of the scatterer is, the stronger the scattering is in the forward direction in which the light propagates.

In contrast, if the size of the scatterer is smaller than 1/10 the wavelength of light, Rayleigh scattering may occur. In Rayleigh scattering, the direction in which light is scattered does not depend on the particle size of the scatterer. In Rayleigh scattering, regardless of the particle size of the scatterer, light is distributed and scattered in the propagation direction of light, producing a FIG. 8 pattern. Also, in Rayleigh scattering, the shorter the wavelength of light is, the stronger the scattering of light becomes.

If the first layer 11 in which the scatterer, i.e., the filler 31, is dispersed is required to have transparency as in the present embodiment, the average particle size of the filler 31 is required to be not more than the wavelength of light, and Rayleigh scattering is required to be caused by the filler 31. Therefore, the filler 31 is preferred to have an average particle size of 400 nm or less. When the average particle size of the filler 31 is D, and the wavelength of light is λ, a scattering cross-sectional area α is calculated by the following Formula (6).

$$\alpha = \pi D / \lambda \quad \text{Formula (6)}$$

Whether the scattering phenomenon caused by the filler 31 is Rayleigh scattering or Mie scattering can be simply and easily determined by using Formula (6). It is known that Mie scattering mainly occurs when the scattering cross-sectional area α is more than 0.4 and less than 3, while Rayleigh scattering mainly occurs when the scattering cross-sectional area α is 0.4 or less. Therefore, when the light incident on the filler 31 is in the visible range, and if the wavelength of the light is 400 nm and the average particle size of the filler 31 is 50 nm or less, Rayleigh scattering can be mainly caused by the filler 31. Thus, the light incident on the first layer 11 can be scattered by the filler 31 in a state where the first layer 11 has high transparency.

As described above, the optical element according to the third embodiment achieves the following advantageous effects.

(7) The angular range of light emerging from the optical element 30 is broadened compared to the case in which the first layer 11 contains no filler. Thus, the observation angular range in which the observer can observe the color exhibited by the optical element 30 is broadened.

Fourth Embodiment

Figure 16:
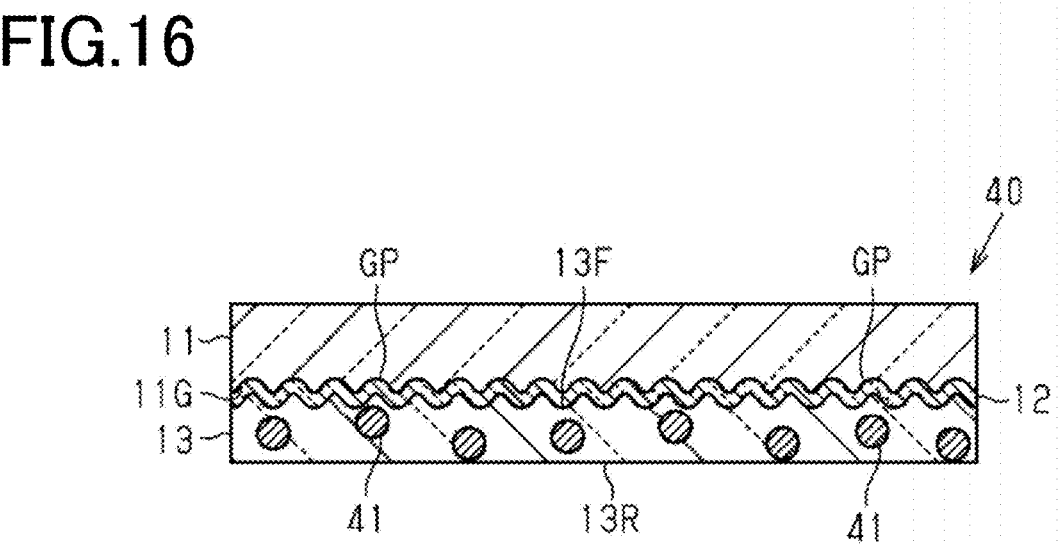
FIG. 16 is a schematic cross-sectional view illustrating a structure of a first example of an optical element according to a fourth embodiment of the present invention.

Referring to FIGS. 16 and 16, an optical element according to a fourth embodiment will be described. The optical element according to the fourth embodiment of the present invention is different from the optical element 10 of the first embodiment in the state of the surface of the third layer 13 facing away from the surface contacting the second layer 12. While the differences will be specifically described below, the components of the optical element of the fourth embodiment corresponding to those of the optical element 10 of the first embodiment are given the same reference signs to omit duplicate description. A first example and a second example of the fourth embodiment will be sequentially described below.

First Example

FIG. 16 shows an optical element 40 including a third layer 13 that is an adhesive layer having thermoplasticity. The third layer 13 contains a filler 41 dispersed in a portion closer to the surface facing away from the surface contacting the second layer 12 than to the center of the third layer 13 in the thickness direction. The surface of the third layer 13 contacting the second layer 12 is a front surface 13F, and the surface facing away from the front surface 13F is a rear surface 13R. As mentioned above, the filler 41 is preferred to be located closer to the rear surface 13R than to the center of the third layer 13 in the thickness direction and is preferred to be located in the vicinity of the rear surface 13R.

As mentioned above, the third layer 13 is an adhesive layer having thermoplasticity. The material forming the third layer 13 may be an adhesive having thermoplasticity. Since the third layer 13 is an adhesive layer having thermoplasticity, the optical element 40 can be transferred to a transfer target by applying heat and pressure to the optical element 40 in a state where the third layer 13 is in contact with the transfer target. In this case, by application of the heat and pressure to the third layer 13, asperities are produced on the rear surface 13R of the third layer 13 due to the filler 41, by which asperities are also produced on the front surface 13F of the third layer 13. As a result, asperities are also produced at portions of the first and second layers 11 and 12 corresponding to the portions of asperities formed on the third layer 13, as viewed in the thickness direction of the optical element 40. Thus, asperities due to the filler 41 are provided to the subwavelength grating 11G at the interface between the first and second layers 11 and 12. Examples of the transfer target include banknotes, passports and cards.

The asperities at the interface between the first and second layers 11 and 12 can be controlled according to the size of the filler 41, the thicknesses of the layers 11, 12 and 13, and the conditions of heat and pressure when transferring the optical element 40.

Since the subwavelength grating 11G is provided with the asperities due to the filler 41, the plurality of grating patterns GP forming the subwavelength grating 11G can include those grating patterns GP having different light incidence angles. These types of grating patterns GP reflect the m-th order diffracted light at respective emergence angles according to angles of light incident on the grating patterns GP. The angular range in which the m-th order diffracted light emerges from each type of grating patterns depends on the asperity curvature imparted to the grating patterns GP. In other words, the observation angle at which the observer can observe the color exhibited by the subwavelength grating 11G depends on the asperity curvature imparted to each type of grating patterns GP.

As described above, the color exhibited by the optical element 40 is preferred to be maintained in an observation angular range of 2° or more. However, if the observation angular range where the color exhibited by the optical element 40 can be observed is excessively wide, the intensity of light emerging from the optical element 40 at each observation angle is lowered. Thus, the observation angular range where the color exhibited by the optical element 40 can be observed is preferred to be 2° or more and 10° or less, and more preferably 2° or more and 5° or less. The emergence angles of the m-th order diffracted light emerging from all the types of grating patterns GP are preferred to be in this observation angular range.

Therefore, the asperity curvature due to the filler 41 is preferred not to be excessively large. As methods of avoiding an excessively large asperity curvature due to the filler 41, the following two methods may be mentioned. In a first method, the filler 41 may be uniformly dispersed in the third layer 13, and the conditions of heat and pressure during the transfer may be controlled so that the asperity curvature does not become excessively large. In a second method, a flat-particle filler may be used as the filler 41 instead of a spherical-particle filler and dispersed in the third layer 13 so that the filler 41 has a smaller particle size in the thickness direction of the third layer 13.

Second Example

Figure 17:
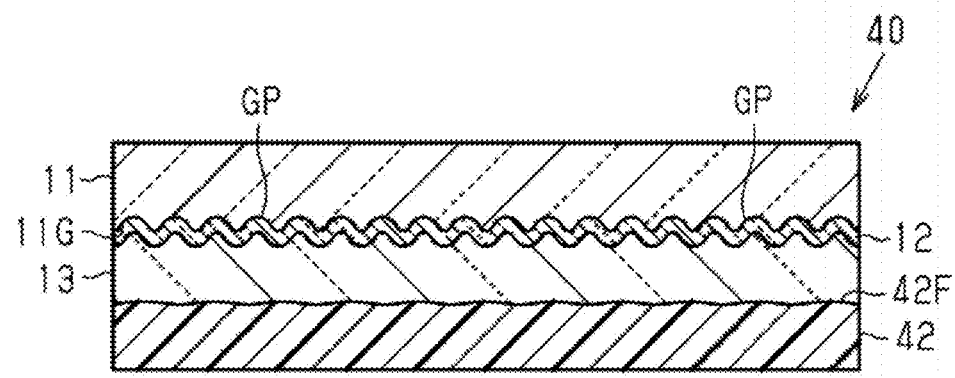
FIG. 17 is a schematic cross-sectional view illustrating a structure of a second example of the optical element according to the fourth embodiment of the present invention.

As shown in FIG. 17, the optical element 40 further includes a fourth layer 42 contacting the third layer 13. The fourth layer 42 includes a front surface 42F contacting the third layer 13. The front surface 42F includes asperities.

The asperities on the front surface 42F of the fourth layer 42 may be formed by various methods. The asperities may be formed on the front surface 42F of the fourth layer 42 when transferring the third layer 13 to the fourth layer 42, i.e., a transfer target, for conformity with the third layer 13 that has been deformed by heat and pressure. In this case, an adhesive layer having thermoplasticity may be used as the third layer 13. The fourth layer 42 may be paper or a plastic film. Alternatively, asperities may be formed on the front surface 42F of the fourth layer 42 by dispersing microparticles or fibers in the fourth layer 42. Alternatively, asperities may be formed on the front surface 42F of the fourth layer 42 making use of defoaming or unevenness which occurs when forming the fourth layer 42. In the second example, as in the first example, the subwavelength grating 11G may be provided with asperities due to the front surface 42F of the fourth layer 42. Thus, the optical element 40 of the second example also achieves advantageous effects similar to those of the optical element 40 of the first example.

When the fourth layer 42 is a transfer target and contains microparticles, the microparticles are preferred to have an average particle size substantially equal to the thickness of the third layer 13 serving as an adhesive layer. During transfer to the fourth layer 42, the conditions of heat and pressure may be controlled to prevent the asperities provided to the subwavelength grating 11G from becoming excessively large.

Paper may be used as a fourth layer 42 in which fibers are dispersed. In this case, the fibers forming the fourth layer 42 are arranged parallel to the front surface 42F of the fourth layer 42. Pulp fibers have a diameter of about 20 μm or more and 50 μm or less, and a length of about 1 mm or more and 5 mm or less. Thus, the asperities formed on the subwavelength grating 11G may become excessively large. In this regard, cellulose nanofibers have a diameter of about 4 nm or more and 100 nm or less, and a length of about 5 μm or more. Thus, the asperities formed on the subwavelength grating 11G may be prevented from being excessively large. Cellulose nanofibers are obtained by defibrating pulp fibers.

As described above, the optical element according to the fourth embodiment achieves the following advantageous effects.

(8) Since the asperities due to the filler 41 are formed on the subwavelength grating 11G, the plurality of grating patterns GP can include those grating patterns GP having different incidence angles. Since the emergence angle is also different between the grating patterns GP, the observation angle at which the light emerging from the subwavelength grating 11G is observed is broadened.

(9) Since the asperities due to the front surface 42F of the fourth layer 42 are formed on the subwavelength grating 11G, the plurality of grating patterns GP can include those grating patterns GP having different incidence angles. Since the emergence angle is also different between the grating patterns GP, the observation angle at which the light emerging from the subwavelength grating 11G is observed is broadened.

Fifth Embodiment

Referring to FIGS. 18 to 24, an optical element according to a fifth embodiment will be described. The optical element according to the fifth embodiment of the present invention is different from the optical element of the first embodiment in that a relief layer having a relief surface is provided to the optical element. While the differences will be specifically described below, the components of the optical element of the fifth embodiment corresponding to those of the optical element 10 of the first embodiment are given the same reference signs to omit duplicate description. Two examples of the fifth embodiment will be sequentially described below.

First Example

[Configuration of Optical Element]
Referring to FIG. 18, an optical element according to a first example will be described.

Figure 18:
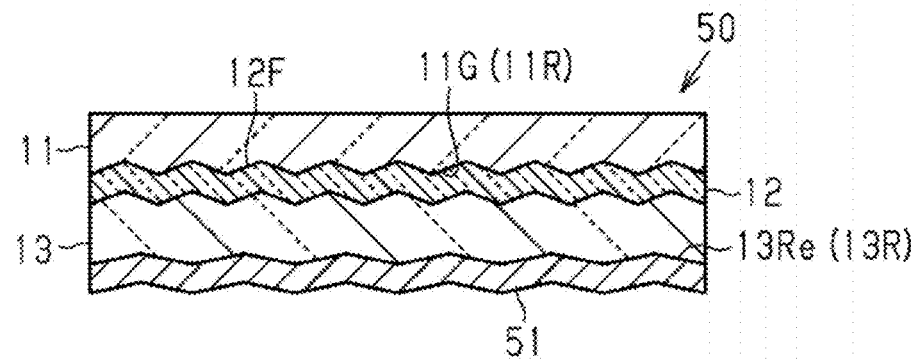
FIG. 18 is a schematic cross-sectional view illustrating a structure of a first example of an optical element according to a fifth embodiment of the present invention.

FIG. 18 shows an optical element 50 including a first layer 11, a second layer 12 contacting the first layer 11, and a third layer 13 contacting the second layer 12, similarly to the optical element 10 of the first embodiment described above. The first layer 11 is a resin layer which includes a rear surface 11R contacting the second layer 12 and at least partially including a subwavelength grating 11G. The rear surface 11R is an example of a first surface. In FIG. 18, for convenience of illustration, the cross-sectional configuration is shown as if the subwavelength grating 11G is provided on the entire rear surface 11R. However, in the optical element 50 of the present embodiment, the subwavelength grating 11G is formed only on part of the rear surface 11R.

The second layer 12 has a front surface 12F contacting the rear surface 11R of the first layer 11 and having asperities conforming to the subwavelength grating 11G. The front surface 12F is an example of a second surface. The second layer 12 is a dielectric layer having a second refractive index which is higher than a first refractive index. The third layer 13 is a resin layer having a third refractive index lower than the second refractive index.

The optical element 50 includes a relief layer having a relief surface 13Re different from the rear surface 11R or the front surface 12F. The relief surface 13Re includes a plurality of reflective surfaces, in which the pitch between adjacent reflective surfaces is greater than the pitch of the subwavelength grating 11G. In the present embodiment, the relief layer is the third layer 13 described above. More specifically, a rear surface 13R of the third layer 13, which is the surface facing away from the surface contacting the second layer 12, is the relief surface 13Re.

In FIG. 18, for convenience of illustration, the relief surface 13 Re is shown as if provided on the entire front surface 13R. However, in the optical element 50 of the present embodiment, the relief surface 13 Re is formed only on part of the front surface 13R. The relief surface 13Re may be formed on the front surface 13R so as to be located at a portion overlapping the subwavelength grating 11G as viewed in the thickness direction of the optical element 50.

The subwavelength grating 11G displays a colored image presenting a color corresponding to the grating period of the subwavelength grating 11G in reflection directions including the specular reflection direction. The relief surface 13Re displays a reflection image produced by monochromatic reflected light in reflection directions including a direction different from the specular reflection direction. Examples of the color of the monochromatic reflected light include white, silvery white, silver, semi-white, pearl white, silky white, milky white, grey and sepia. The optical element 50 has a first state in which neither a colored image nor a reflection image is displayed, a second state in which a colored image is mainly displayed, a third state in which a reflection image is mainly displayed, and a fourth state in which both of a colored image and a reflection image are mainly displayed. The angle between the plane in which the optical element 50 is disposed and the plane including the line of sight of the observer is an observation angle. The optical element 50 has any of the states according to the observation angle. Specifically, the optical element 50 may be observed in any of the first, second and third states according to the observation angle. The subwavelength grating 11G displays a colored image presenting a color corresponding to the grating period of the subwavelength grating, in a predetermined range of an observation angle including the specular reflection direction. The relief surface 13Re displays a reflection image produced by monochromatic reflected light, in a predetermined range of an observation angle including a direction different from the specular reflection direction.

The optical element 50 further includes a fourth layer 51. The fourth layer 51 may be a reflective layer or may be a refractive layer. The fourth layer 51, when being a refractive layer, may have a refractive index different from that of the third layer 13. If the refractive index of the fourth layer 51 differs from that of the third layer 13, the fourth layer 51 may increase reflectance of the relief surface 13Re. The reflectance at an interface between two adjacent layers is determined by the difference in refractive index between the two layers. Thus, the fourth layer 51 having a refractive index different from the third layer 13 may achieve the same advantageous effects as in the case where the fourth layer 51 is a reflective layer.

As mentioned above, the optical element 50 is observed from the side of the second layer 12 opposite to that facing the third layer 13. Thus, the fourth layer 51 may or may not have optical transparency. The fourth layer 51 may be formed of a single layer or a plurality of layers. If the fourth layer 51 is a refractive layer and is formed of a plurality of layers, the fourth layer 51 may include a layer having a relatively low refractive index and a layer having a relatively high refractive index.

The relief surface 13Re includes a plurality of reflective surfaces as mentioned above. The relief surface 13Re displays a reflection image produced by monochromatic light based on at least one of diffraction, scattering and reflection. The relief surface 13Re includes a plurality of reflective surfaces as described above, and these reflective surfaces may be arranged on the relief surface 13Re according to a predetermined regularity or may be irregularly arranged. The direction of light emerging from the relief surface 13Re can be controlled by changing the orientations or angles of the respective reflective surfaces.

The orientation of each reflective surface may match the direction of a normal vector to the reflective surface projected onto the plane in which the first layer 11 is disposed. The angle of each reflective surface may match the angle between the normal vector to the plane in which the first layer 11 is disposed and the normal vector to the reflective surface. The orientation of each reflective surface may be equal to or orthogonal to the azimuth of the subwavelength grating 11G. Furthermore, if the subwavelength grating 11G has a plurality of azimuths, an average of these azimuths may be used as the azimuth of the subwavelength grating 11G. The average may be a weighted average obtained as a result of weighting the several subwavelength gratings by the respective areas of the regions where they are formed. Thus, when the observer OB tilts a card 100 toward themselves with respect to a reference plane Ph0, the card 100 displays a first image P1 and a second image P2 according to the position of the card 100. In other words, when the observer OB tilts the card 100 in an observation space to bring a front surface 100F thereof to face more toward the observer OB, with the observer OB's holding position of the card 100 being substantially fixed, the card 100 displays the first and second images P1 and P2 according to the position of the card 100 (see FIG. 40).

The light emerging from the subwavelength grating 11G is in an emerging direction range including the specular reflection direction as mentioned above. Of the light emerging from the subwavelength grating 11G, the light emerging in the specular reflection direction has the highest intensity. In contrast, the light emerging from the relief surface 13Re is in an emerging direction range including a direction different from the specular reflection direction. Of the light emerging from the relief surface 13Re, the light emerging in a direction different from the specular reflection direction has the highest intensity. In other words, the orientations and angles of the reflective surfaces of the relief surface 13Re are determined so that the light emerging in a direction different from the specular reflection direction has the highest intensity, of the light emerging from the relief surface 13Re.

The reflective surfaces of the relief surface 13Re may have a period more than 400 nm and 1,000 nm or less, or more than 1,000 nm. To minimize the diffracted light emerging from the relief surface 13Re, the period of the reflective surfaces is preferred to be more than 1,000 nm.

The relief surface 13Re may have a sawtooth configuration in a cross sectional orthogonal to the direction in which the reflective surfaces extend.

The colored image displayed by the subwavelength grating 11G is produced by light having a specific wavelength included in the wavelength of visible light. As an example, the colored image may be a multihued image, such as a red image, a green image or a blue image. When the subwavelength grating 11G displays a red image, light emerging from the subwavelength grating 11G includes, as an example, light having a wavelength in the range of 620 nm or more and 750 nm or less. When the subwavelength grating 11G displays a green image, light emerging from the subwavelength grating 11G includes, as an example, light having a wavelength in the range of 495 nm or more and 570 nm or less. When the subwavelength grating 11G displays a blue image, light emerging from the subwavelength grating 11G includes, as an example, light having a wavelength in the range of 450 nm or more and 495 nm or less. The expression that the subwavelength grating 11G displays a colored image is synonymous with the expression that the subwavelength grating 11G presents a multihued color.

The reflection image displayed by the relief surface 13Re refers to an image produced by monochromatic light which is produced by reflection, scattering or diffraction at the relief surface 13Re. In other words, the reflection image displayed by the relief surface 13Re is a monochromatic image having no hue. The relief surface 13Re may be configured so that the monochromatic light emerging therefrom is different in intensity between positions. Thus, the relief surface 13Re displays an image depending on the difference in light intensity, in other words, depending on the difference in brightness. The expression that the relief surface 13Re displays a monochromatic reflection image is synonymous with the expression that the relief surface 13Re presents a monochromatic color.

[Functions of Optical Element]

Referring to FIGS. 19 to 23, functions of the optical element 50 will be described.

Figure 19:
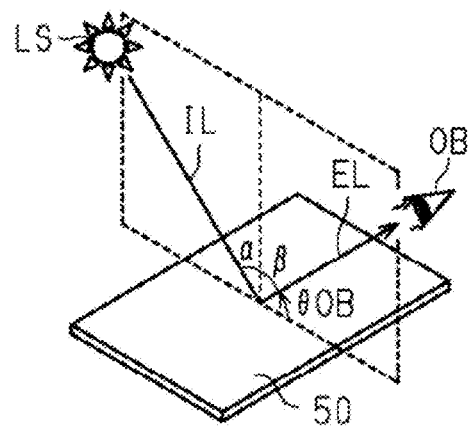
FIG. 19 is a schematic diagram illustrating functions of the first example of the optical element according to the fifth embodiment of the present invention.

As shown in FIG. 19, the angle at which incident light IL emitted from a light source LS is incident on the optical element 50 is an incidence angle $\alpha$, and the angle at which emergence light EL emerges from the optical element 50 is an emergence angle $\beta$. The angle between a plane including a line of sight direction of the observer OB and a plane in which the optical element 50 is disposed is an observation angle $\theta OB$. The specular reflection direction described above refers to the direction in which the emergence light EL emerges at the emergence angle $\beta$ equal to the incidence angle $\alpha$. In the optical element 50, the subwavelength grating 11G displays a colored image in the reflection directions including the specular reflection direction, while the relief surface 13Re displays a reflection image, which is produced by monochromatic light, in the reflection directions including a direction different from the specular reflection direction. The optical element 50 has any of the following four states according to the observation angle $\theta OB$.

The present embodiment will be described, taking an example in which the colored image displayed by the subwavelength grating 11G has a crescent shape, and the reflection image displayed by the relief surface 13Re has a star shape. It should be noted that the colored image displayed by the subwavelength grating 11G and the reflection image displayed by the relief surface 13Re may have any shape. The image displayed by the subwavelength grating 11G is a first image, and the image displayed by the relief surface 13Re is a second image.

Figure 20:
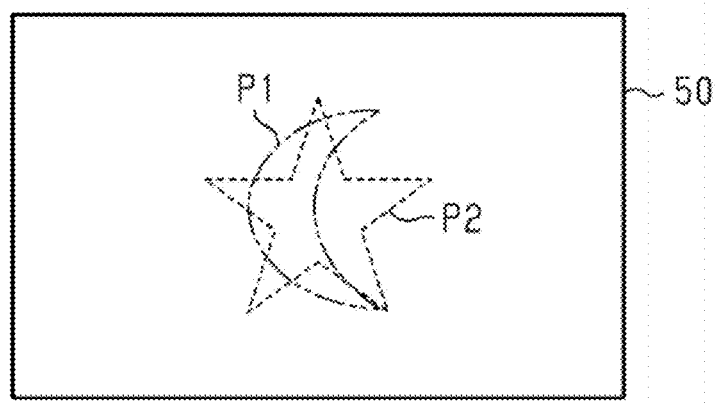
FIG. 20 is a schematic plan view illustrating a first state of the first example of the optical element according to the fifth embodiment of the present invention.

FIG. 20 shows the optical element 50 in a first state.

As shown in FIG. 20, in the optical element 50 in the first state, a first image P1 and a second image P2 both disappear. In the first state, the brightness of light producing the first image P1 and the brightness of light producing the second image P2 are so low that the observer OB can identify neither the first image P1 nor the second image P2. In other words, at the observation angle $\theta OB$ where the observer OB observes the optical element 50, the brightness of light reflected by the subwavelength grating 11G and the brightness of light reflected by the relief surface 13Re are both lower than the brightness of the reflected light of the medium to which the optical element 50 is affixed. Therefore, the observer OB can identify neither the first image P1 nor the second image P2.

Figure 21:
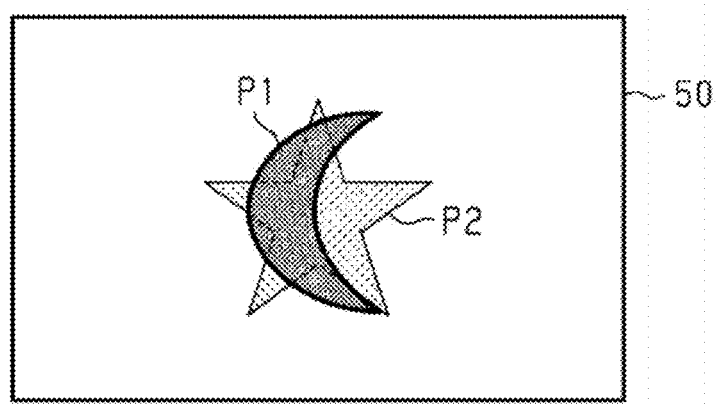
FIG. 21 is a schematic plan view illustrating a second state of the first example of the optical element according to the fifth embodiment of the present invention.

FIG. 21 shows the optical element 50 in a second state.

As shown in FIG. 21, in the optical element 50 in the second state, the first image P1 appears and the second image P2 disappears. The state in which the first image P1 appears refers to a state in which the brightness of light of the first image P1 is higher than the brightness of light of the second image P2, i.e., a state in which the optical element 50 displays the first image P1. Thus, the second state includes a state in which the first image P1 is identified but the second image P2 is not identified. Also, the second state includes a state in which the first and second images P1 and P2 appear on the optical element 50, and the brightness of light of the first image P1 is higher than the brightness of light of the second image P2.

In other words, at the observation angle $\theta OB$ where the observer OB observes the optical element 50, the light reflected by the subwavelength grating 11G is easily perceived by the observer, but the light reflected by the relief surface 13Re is less likely to be perceived by the observer.

Figure 22:
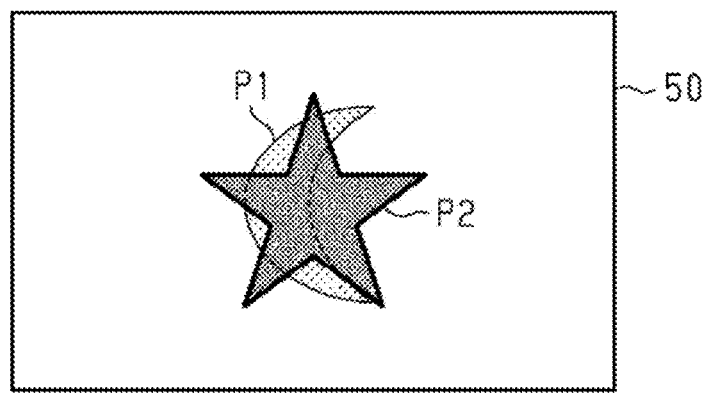
FIG. 22 is a schematic plan view illustrating a third state of the first example of the optical element according to the fifth embodiment of the present invention.

FIG. 22 shows the optical element 50 in a third state.

As shown in FIG. 22, in the optical element 50 in the third state, the second image P2 appears. The state in which the second image P2 appears refers to a state in which the brightness of light of the second image P2 is higher than the brightness of light of the first image P1, i.e., a state in which the optical element 50 displays at least the second image P2. Thus, the third state includes a state in which the second image P2 is identified, but the first image P1 is not identified. Also, the third state includes a state in which the optical element 50 displays the second and first images P2 and P1, and the brightness of light of the second image P2 is higher than the brightness of light of the first image P1.

In other words, at the observation angle $\theta OB$ where the observer OB observes the optical element 50, the brightness of light reflected by the relief surface 13Re is at a level that the observer can identify the image, but the brightness of light reflected by the subwavelength grating 11G is not at a level that the observer can identify.

Figure 23:
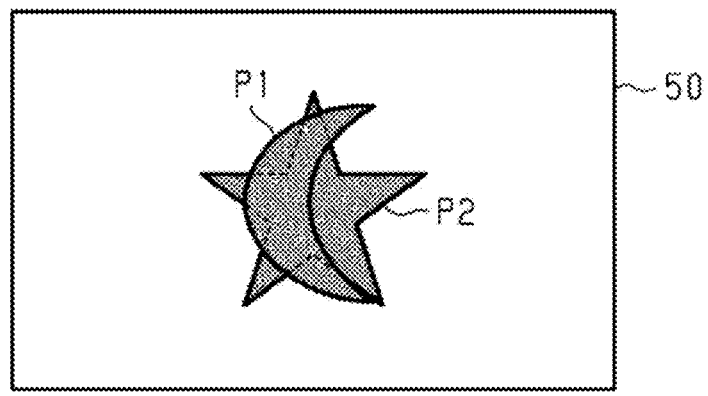
FIG. 23 is a schematic plan view illustrating a fourth state of the first example of the optical element according to the fifth embodiment of the present invention.

FIG. 23 shows the optical element 50 in a fourth state.

As shown in FIG. 23, in the optical element 50 in the fourth state, the first and second images P1 and P2 both appear. The state in which both the first and second images P1 and P2 appear refers to a state in which both the first and second images P1 and P2 on the optical element 50 are identified by the observer. In this state, the brightness of light of the first image P1 may be substantially equal to the brightness of light of the second image P2. In other words, at the observation angle $\theta OB$ where the observer OB observes the optical element 50, the light reflected by the subwavelength grating 11G and the light reflected by the relief surface 13Re have intensities enabling the observer OB to identify these reflections. The optical element 50 is only required to present the first to third states. The optical element 50 does not necessarily have to present the fourth state.

In this manner, the optical element 50 displays a reflection image, i.e., a monochromatic image, produced by monochromatic reflected light and a colored image, i.e., a multihued image, produced by light having a specific wavelength range. When distinguishing between monochromatic and multihued images, i.e., between two images, subjective differences are less likely to occur compared to distinguishing between a first monochromatic image and a second monochromatic image, or between a first multihued image and a second multihued image. Consequently, subjective differences are less likely to occur in the optical element 50 in authenticity verification and the criteria for authenticity verification can be easily defined, compared to the case where the authenticity of the optical element 50 would have been verified based on two multihued images or two monochromatic images.

The optical element 50 has the second state in which the first image P1 is mainly displayed, the third state in which the second image P2 is mainly displayed, and the first state in which neither the first image P1 nor the second image P2 is displayed. Since the second or third state contrasts with the first state, subjective differences are less likely to occur when distinguishing the second or third state from the first state. Consequently, subjective differences are less likely to occur in authenticity verification, and the criteria for authenticity verification can be easily defined.

Second Example

Figure 24:
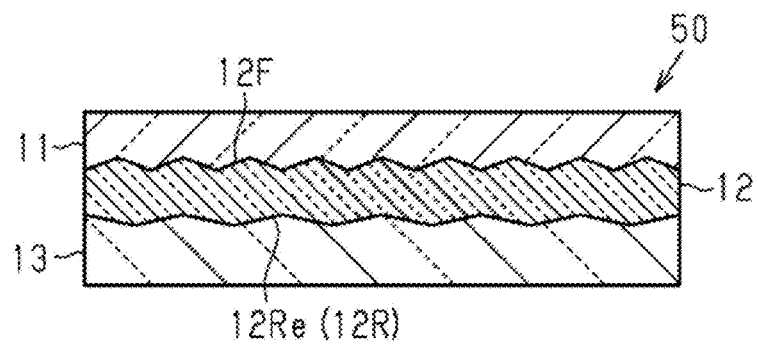
FIG. 24 is a schematic cross-sectional view illustrating a structure of a second example of the optical element according to the fifth embodiment of the present invention.

Referring to FIG. 24, a second example of the optical element 50 will be described.

As shown in FIG. 24, an optical element 50 of the second example includes a first layer 11, a second layer 12, a third layer 13 as in the optical element 50 of the first example. In the optical element 50 of the second example, the second layer 12 is a relief layer. In the second layer 12, the relief surface 12Re may be on the surface, i.e., on the rear surface 12R, facing away from the front surface 12F of the second layer 12. In FIG. 24, the relief surface 12Re is provided on the entire rear surface 12R. However, the relief surface 12Re may be provided across all or part of the rear surface 12R.

The optical element 50 of the second example displays a colored image produced by the light reflected by the subwavelength grating 11G, according to the difference in refractive index between the first and second layers 11 and 12. Furthermore, the optical element 50 of the second example displays a reflection image produced by the light reflected by the relief surface 12Re, according to the difference in refractive index between the second and third layers 12 and 13.

In the optical element 50 of the second example, the surface of the third layer 13 facing away from the surface contacting the second layer 12 may be flat or may have a configuration conforming to the asperities of the relief surface 12Re of the second layer 12.

As described above, the optical element according to the fifth embodiment achieves the following advantageous effects.

(10) Since the optical element 50 displays a colored image and a reflection image produced by monochromatic light, subjective differences are less likely to occur when distinguishing the two images. Consequently, in the optical element 50, subjective differences are less likely to occur in authenticity verification, and the criteria for authenticity verification can be easily defined.

(11) Since the second layer 12 includes the subwavelength grating 11G and the relief surface 12Re, the reflectance of the subwavelength grating 11G can be increased according to the difference in refractive index between the first and second layers 11 and 12, and the reflectance of the relief surface 12Re can be increased according to the difference in refractive index between the second and third layers 12 and 13.

[Modification of Fifth Embodiment]

The fifth embodiment described above may be appropriately modified and implemented as follows.

[Subwavelength Grating]

In the optical element 10 of the first embodiment, the subwavelength grating 11G includes the first and second regions 11S1 and 11S2. However, the subwavelength grating 11G of the optical element 50 may be configured by only one region.

[Relief Layer]

In the optical element 50, the first layer 11 may be a relief layer. Specifically, the surface of the first layer 11 facing away from the surface including the subwavelength grating 11G may include a relief surface. In such a case also, an advantageous effect similar to item (10) set forth above may be achieved.

In the optical element 50 of the second example, the front surface of the third layer 13, i.e., the surface contacting the relief surface 12Re, has a configuration conforming to the relief surface 12Re. Thus, the surface of the third layer 13 can also function as a relief surface.

[Relief Surface]

Figure 25:
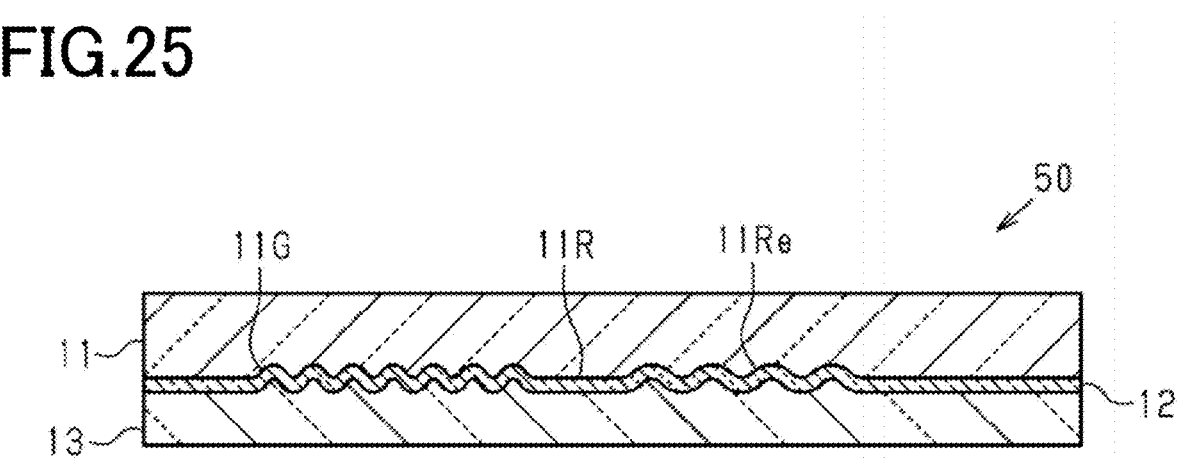
FIG. 25 is a cross-sectional view illustrating a structure according to a modification of the optical element of the fifth embodiment of the present invention.

As shown in FIG. 25, in the optical element 50, the first layer 11 may have a rear surface 11R including a subwavelength grating 11G and a relief surface 11Re. In this case, the subwavelength grating 11G and the relief surface 11Re can be formed simultaneously by using one original plate. Thus, the positional accuracy of the subwavelength grating 11G is enhanced relative to the position of the relief surface 11Re.

As shown in FIG. 25, the subwavelength grating 11G and the relief surface 11Re may be located on the same surface, and as viewed in a direction perpendicular to the rear surface 11R of the first layer 11, part of the region where the first image P1 is displayed may overlap part of the region where the second image P2 is displayed. The region where the first image P1 is displayed may overlap the region where the second image P2 is displayed. Furthermore, part or all of the contour of the region where the first image P1 is displayed may overlap part or all of the contour of the region where the second image P2 is displayed. Overlap of the contours of the first and second images P1 and P2 can facilitate comparison between two designs. In this case, in the regions of partial overlap, the pixel regions Px, i.e., sub-pixel regions, where the subwavelength grating 11G is located, and relief pixel regions where the relief surface 11Re is located may be arranged as follows. As an example, the sub-pixel regions and the relief pixel regions may be arranged in a checkerboard pattern, a stripe pattern, a honeycomb pattern or a concentric pattern.

As viewed in a direction perpendicular to the rear surface 11R of the first layer 11, the sub-pixel regions and the relief pixel regions may be arranged as follows in the case of overlap of part of the region where the first image P1 is displayed with part of the region where the second image P2 is displayed. Specifically, in a display region of the first image P1, the proportion of the sub-pixel regions may be increased toward the outer edge of the first image P1 from the region where part of the display region of the first image P1 overlaps part of the display region of the second image P2. Also, in a display region of the second image P2, the proportion of the relief pixel regions may be increased toward the outer edge of the second image P2 from the region where part of the display region of the first image P1 overlaps part of the display region of the second image P2. Thus, brightness is lowered in the region where the display region of the first image P1 overlaps part of the display region of the second image P2, due to the smaller proportion of the sub-pixel regions and the relief pixel regions than in other regions. The lowered brightness may help in recognizing the respective designs of the first and second images P1 and P2.

Figure 26:
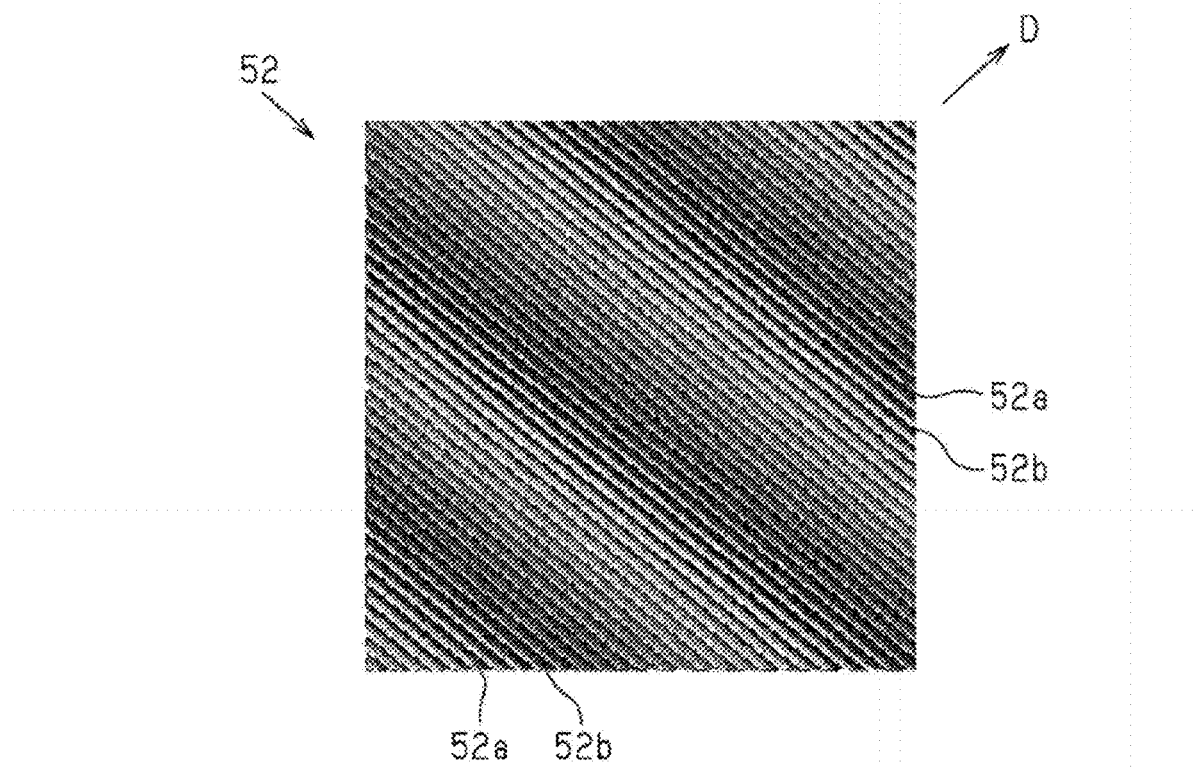
FIG. 26 is a plan view illustrating a quantized retardation structure of a relief surface according to a modification of the optical element of the fifth embodiment of the present invention.
Figure 27:
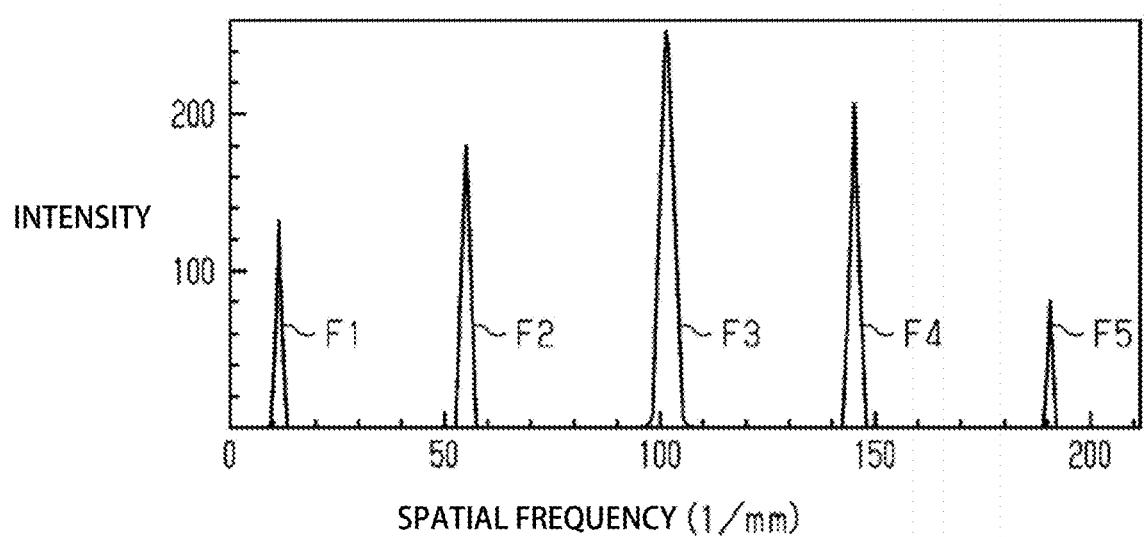
FIG. 27 is a graph showing peaks in spatial frequency components of the quantized retardation structure shown in FIG. 25.
Figure 28:
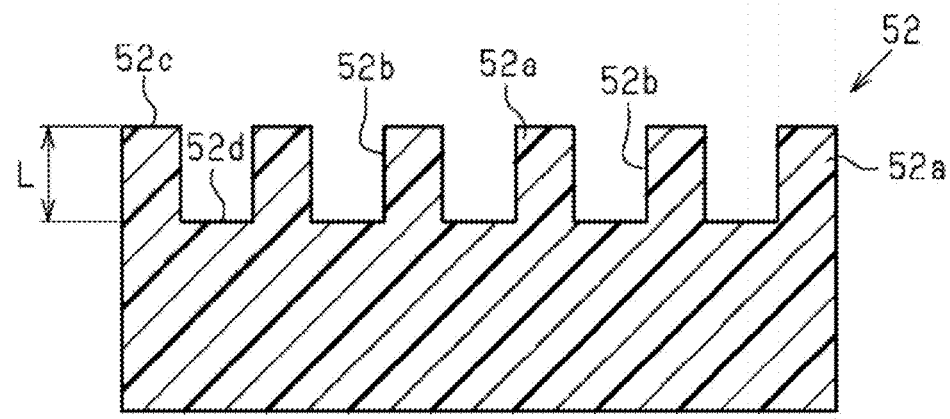
FIG. 28 is a schematic cross-sectional view illustrating the quantized retardation structure shown in FIG. 26.

The layer including a relief surface may include a quantized retardation structure described below and may display a reflection image produced by monochromatic light with this structure. Referring to FIGS. 26 to 28, the structure of a layer including a relief surface will be described.

FIG. 26 shows a structure as viewed perpendicular to a relief surface. FIG. 26 shows a quantized retardation structure 52 including an array of quantized convexities 52a having a uniform size and quantized concavities 52b having a uniform size. In FIG. 26, light portions are the quantized convexities 52a and dark portions are the quantized concavities 52b. The quantized convexities 52a and the quantized concavities 52b are arranged at regular intervals. A quantized concavity 52b or a quantized convexity 52a is adjacent to each quantized convexity 52a at a regular interval. A quantized convexity 52a or a quantized concavity 52b is adjacent to each quantized concavity 52b at a regular interval. As an example, the quantized convexities 52a and the quantized concavities 52b of the quantized retardation structure 52 may be alternated singly or in groups.

In the quantized retardation structure 52, spatial frequency components having a coarse period can be superposed with spatial frequency components having a fine period on the relief surface according to the array of the quantized convexities and concavities 52a and 52b. The relief surface may be a cell enclosing the quantized retardation structure 52. In the quantized retardation structure 52 of the relief surface, crest-like convexities and trough-like concavities may be adjacently and alternately arranged. The crest-like convexities are the unidirectionally arranged quantized convexities 52a. The trough-like concavities are quantized concavities as element structures having a uniform size arranged parallel to the crest-like convexities.

The quantized convexities 52a may have a size of not less than 1/20 and not more than 1/2 the central wavelength of the visible wavelength region. The quantized concavities 52b may have a size of not less than 1/20 and not more than 1/2 the central wavelength of the visible wavelength region. Specifically, the size of the quantized convexities 52a may be in the range of 25 nm or more and 250 nm or less. The size of the quantized concavities 52b may be in the range of 25 nm or more and 250 nm or less. The quantized convexities 52a may each have a square shape as viewed perpendicular to the relief surface.

The quantized concavities 52b may each have a square shape as viewed perpendicular to the relief surface. The quantized convexities 52a may have rounded corners as viewed perpendicular to the relief surface. The quantized concavities 52b may have rounded corners as viewed perpendicular to the relief surface.

The quantized convexities and concavities 52a and 52b may be arranged in an imaginary grid. The quantized convexities 52a may have a height equal to a reference height or an integral multiple thereof. The quantized concavities 52b may have a depth equal to a reference depth or an integral multiple thereof. The reference height and the reference depth may be the same. If the reference height and the reference depth are the same, the integral multiple may be in the range of 1 or more and 4 or less. The integral multiple may be in the range of 1 or more and 8 or less. The reference height and the reference depth may be in the range of 10 nm or more and 500 nm or less.

FIG. 27 shows peaks in the spatial frequency components calculated in one direction D shown in FIG. 26. The spatial frequency components are calculated in the direction D preset in the relief surface. When the image of a hologram reconstructed by the relief surface is a group of five reconstruction points, five discrete peaks can be seen at spatial frequency components F1 to F5 corresponding to the reconstruction points. The horizontal axis in FIG. 27 represents spatial frequency (1/mm), and the vertical axis represents the intensity of the spatial frequency component.

If the discrete spatial frequency components are sparse, the reconstructed image may be iridescent, and if dense, the reconstructed image may be monochromatic. The reconstructed image may be made iridescent at a specific observation angle, and monochromatic at other observation angles, by controlling sparseness and denseness of the spatial frequency component distribution.

FIG. 28 is a schematic cross-sectional view illustrating the quantized retardation structure 52. In FIG. 28, the relief surface formed by the quantized retardation 52 is shown as an upper surface.

The layer including the quantized retardation structure 52 has a substantially flat shape. The quantized retardation structure 52 is located on either of the surfaces of the layer facing away from each other. The quantized retardation structure 52 has a length L defined between a top 52c of each quantized convexity 52a and a bottom 52d of each quantized concavity 52b. The length L is constant at any position on the relief surface. The tops 52c of the quantized convexities 52a and the bottoms 52d of the quantized concavities 52b may be substantially parallel to the surface of a carrier used when forming the optical element 50. In the layer including such a quantized retardation structure 52, the color of the reflected light of the quantized retardation structure 52 depends on the length L. Furthermore, the asperity direction, i.e., the vertical direction of the quantized retardation structure 52 as viewed in FIG. 28, is perpendicular to the extending direction of the crest-like convexities and the trough-like concavities, which are defined between the tops 52c of the quantized convexities 52a and the bottoms 52d of the quantized concavities 52b. With this structure, the emergence distribution of the reflected light can be broadened, and the emergence distribution of the reflected light and the color of the reflected light can be controlled without deteriorating the hue of light. In the quantized retardation structure 52, the tops 52c of the quantized convexities 52a and the bottoms 52d of the quantized concavities 52b function as reflective surfaces.

The quantized convexities 52a and the quantized concavities 52b have a lateral width that is an integral multiple of a unit length, and a longitudinal width that is an integral multiple of a unit length as viewed perpendicular to the relief surface. The unit length may be not less than 1/20 and not more than 1/2 the central wavelength of the visible wavelength. The unit length may be in the range of 25 nm or more and 250 nm or less.

In the layer including the quantized retardation structure 52, the quantized retardation structure 52 may be provided to both the surfaces of the layer facing away from each other. The relief surface includes a phase angle recording region. In the phase angle recording region, the quantized retardation structure 52 described above is formed. The extending direction of the trough-like concavities and the crest-like convexities is equal to or orthogonal to the azimuth of the subwavelength grating 11G. In other words, the arrangement direction of the trough-like concavities and the crest-like convexities may be orthogonal to or equal to the azimuth angle of the subwavelength grating 11G. Furthermore, if the subwavelength grating 11G has a plurality of azimuths, an average of these azimuths may be used as the azimuth of the subwavelength grating 11G. The average may be a weighted average obtained as a result of weighting the several subwavelength gratings by the respective areas of the regions where they are formed. Thus, when the observer OB tilts the card 100 toward themselves with respect to a reference plane Ph0, the card 100 displays a first image P1 and a second image P2 according to the position of the card 100. In other words, when the observer OB tilts the card 100 in an observation space to bring a front surface 100F thereof to face more toward the observer OB, with the observer OB's holding position of the card 100 being substantially fixed, the card 100 displays the first and second images P1 and P2 according to the position of the card 100 (see FIG. 40).

The optical element 50 may include a reflective layer on the quantized retardation structure 52. The reflective layer may be translucent or opaque. The reflective layer may be made of metal. Examples of this metal include Al, Ag, Sn, Cr, Ni, Cu, Au and an alloy of these elements. A reflective layer made of metal can be an opaque reflective layer.

Alternatively, the reflective layer may be a dielectric layer having a refractive index different from that of a relief structure forming layer. Alternatively, the reflective layer may be a laminate in which adjacent dielectric layers have different refractive indexes, i.e., may be a dielectric multilayer film. Of the dielectric layers included in the dielectric multilayer film, the layer contacting the relief surface is preferred to have a refractive index different from that of the layer including the relief surface.

The dielectric layer may be made of a metal compound or silicon oxide. The metal compound may be a metal oxide, a metal sulfide or a metal fluoride. Examples of the material for the dielectric layer include $TiO_2$, ZnO, $Si_2O_3$, SiO, $Fe_2O_3$, ZnS, CaF and MgF. The reflective layer of the dielectric layer may be optically transparent.

The reflective layer may be formed by vapor deposition. The vapor deposition may be vacuum deposition, sputtering or the like. The reflective layer may have a thickness in the range of 10 nm or more and 1,000 nm or less.

The reflective layer may be formed using an ink. The ink for forming the reflective layer may be an offset ink, letterpress ink, gravure ink, or the like, depending on the printing method. The ink for forming the reflective layer may be a resin ink, oil-based ink, or water-based ink, depending on the composition. Depending on the drying method, the ink for forming the reflective layer may be an oxidative polymerization type ink, penetrative drying type ink, evaporation drying type ink, or ultraviolet curable ink.

The ink for forming the reflective layer may be a functional ink whose color changes according to the illumination angle or the observation angle. The functional ink may be an optically variable ink, color-shifting ink, or pearl ink.

[First and Second Images]

The observation angular range in which the second image displayed by the relief surface is observed may be greater than the observation angular range in which the first image displayed by the subwavelength grating 11G is observed. Specifically, the optical element 50 may be observed in a state in which the first image is displayed in a first observation angular range and the second image is displayed in a second observation angular range, and the second range may be greater than the first range. This may disturb the uniformity in the changing image displayed by the optical element 50 when it is tilted, compared to the case where the observation angular range for observing the first image is equal to the observation angular range for observing the second image. Thus, the image displayed by the optical element 50 may easily attract the observer's attention. That is, the image displayed by the optical element 50 may enhance visual attraction.

Figure 29:
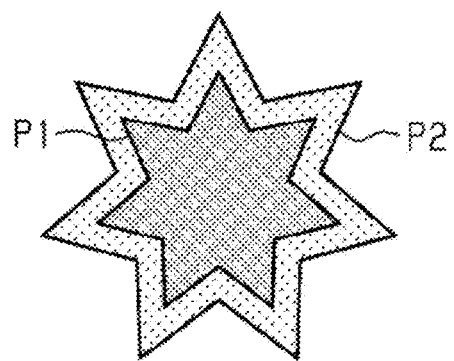
FIG. 29 is a plan view illustrating a first example of a first image and a second image displayed by the optical element according to the fifth embodiment of the present invention.
Figure 30:
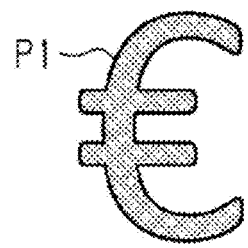
FIG. 30 is a plan view illustrating a second example of a first image and a second image displayed by the optical element according to the fifth embodiment of the present invention.
Figure 31:
FIG. 31 is a plan view illustrating a third example of a first image and a second image displayed by the optical element according to the fifth embodiment of the present invention.

The first image displayed by the subwavelength grating 11G and the second image displayed by the relief surface may correlate with each other. Thus, the observer who has observed the optical element 50 may notice the correlation between the first and second images and may be attracted thereto, compared to the case where the first and second images do not correlate with each other. Referring now to FIGS. 29 to 31, examples of the first and second images having a correlation therebetween will be more specifically described. For convenience of description, FIGS. 29 to 31 each show a state in which both the first and second images are displayed.

FIG. 29 shows a first example of the first image P1 and the second image P2. As shown, the second image P2 is located outside the first image P1 and shaped conforming to the contour of the first image P1. According to the first example, the contour of the first image P1, which is surrounded by the second image P2 having a hue contrasting to the first image P1, is emphasized. Thus, the visual attraction of the first and second images P1 and P2 can be enhanced.

If the relief surface forming the second image P2 includes a plurality of pixel regions Px, and these pixel regions Px include a plurality of reflective surfaces extending in one direction, the relief surface may have the following structure. Specifically, in the pixel regions Px, the azimuth angles of the reflective surfaces may change toward the contour of the second image P2 from the contour of the first image P1. Thus, brightness-based shades can be produced in the second image P2 according to the azimuth angles of the reflective surfaces. Thus, smooth texture and visual attraction can be enhanced in the first and second images P1 and P2.

FIG. 30 shows a second example of the first image P1 and the second image P2. As shown, either of the first and second images P1 and P2 has a shape representing a predetermined symbol or object, and the other of them represents characters indicating the shape. In the example shown in FIG. 30, the first image P1 has a shape of a euro symbol, and the second image P2 represents characters indicating a shape. It should be noted that the second image P2 may have a shape representing a predetermined symbol or object, and the first image P1 may represent characters indicating a shape.

Thus, the first and second images P1 and P2 representing the same meaning are displayed or not displayed according to the observation angle. This may enhance the awareness of the meaning of the first and second images P1 and P2 and may also enhance the visual attraction of the first image and second images P1 and P2.

FIG. 31 shows a third example of the first image P1 and the second image P2. As shown, the first image P1, coupled with the second image P2, provides a shape representing a set of objects. In the example shown in FIG. 31, the first and second images P1 and P2 provide a shape representing a pair of feet. The first image P1 has a shape of a left foot, and the second image P2 has a shape of a right foot. Thus, visual attraction of the first and second images P1 and P2 can be enhanced. The first and second images P1 and P2 may only have to provide a shape representing a set of objects. As an example, they may provide a shape representing a pair of hands.

The first and second images P1 and P2 may have shapes representing different objects and may form one image by complementing each other. That is, the first and second images P1 and P2 may form an optical illusion. Thus, the visual attraction of the first and second images P1 and P2 can also be enhanced.

Sixth Embodiment

Referring to FIGS. 32 to 35, an optical element according to a sixth embodiment will be described. The optical element according to the sixth embodiment of the present invention is different from the optical element 50 of the fifth embodiment in that a layer other than the first, second and third layers 11, 12 and 13 serves as a relief layer. While the differences will be described in detail below, the components of the optical element of the sixth embodiment corresponding to those of the optical element 50 of the fifth embodiment are given the same reference signs to omit duplicate description. The following description sequentially explains four examples of the optical element of the sixth embodiment.

First Example

Figure 32:
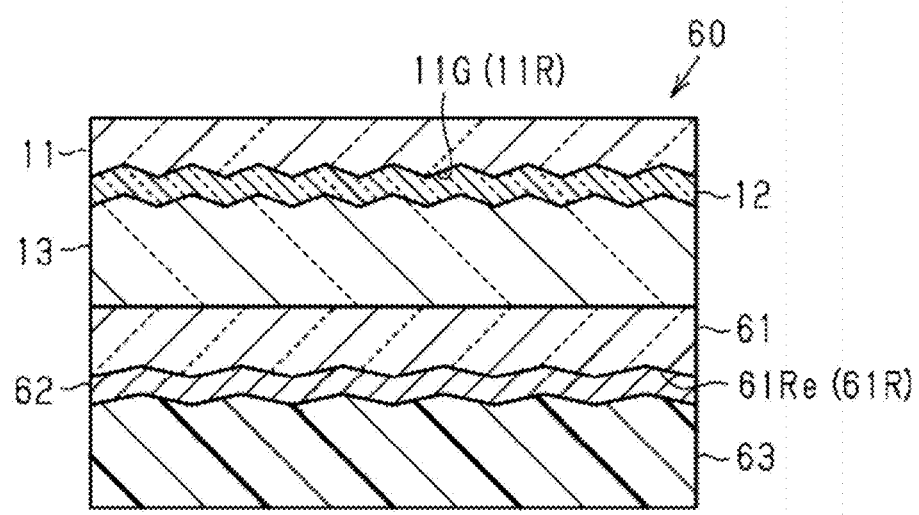
FIG. 32 is a schematic cross-sectional view illustrating a structure of a first example of an optical element according to a sixth embodiment of the present invention.

Referring to FIG. 32, an optical element of a first example will be described.

FIG. 32 shows an optical element 60 including a first layer 11, a second layer 12, and a third layer 13. The optical element 60 further includes a relief layer 61 including a relief surface 61Re. The relief surface 61Re is different from the rear surface 11R and the front surface 12F described above. The relief surface 61Re includes a plurality of reflective surfaces in which adjacent reflective surfaces have a pitch greater than the pitch of the subwavelength grating 11G. The relief surface 61Re is included in a rear surface 61R of the relief layer 61.

The optical element 60 further includes a reflective layer 62 and an adhesive layer 63. The reflective layer 62 contacts the relief surface 61Re and has a configuration conforming to the asperities of the relief surface 61Re. The adhesive layer 63 contacts the reflective layer 62 on the surface facing away from the relief layer 61. In the optical element 60, the third layer 13 serves as an adhesive layer. Thus, the multilayered body of the first and second layers 11 and 12 is adhered to the relief layer 61 via the third layer 13. Therefore, in the optical element 60, the subwavelength grating 11G overlaps the relief surface 61Re as viewed in the thickness direction of the optical element 60.

The adhesive layer 63 may be provided across or at part of the surface of the reflective layer 62 facing away from the surface contacting the relief layer 61.

According to the optical element 60 of the first example, a first multilayered body configured by the first, second and third layers 11, 12 and 13, and a second multilayered body configured by the relief layer 61, the reflective layer 62 and the adhesive layer 63 may be prepared separately. Furthermore, according to the optical element 60 of the first example, the optical element 60 can be affixed to an object to be adhered via the adhesive layer 63.

Second Example

Figure 33:
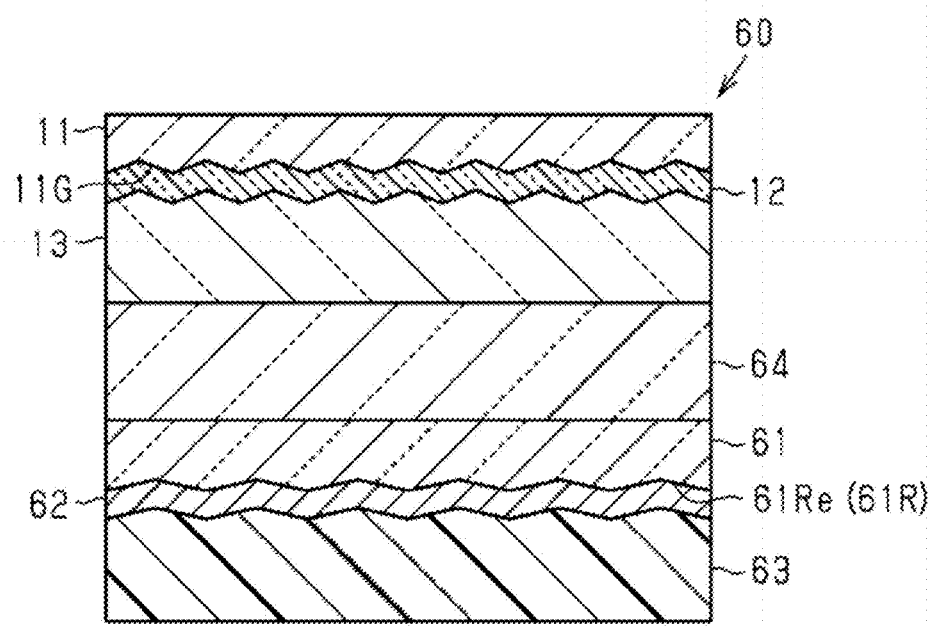
FIG. 33 is a schematic cross-sectional view illustrating a structure of a second example of the optical element according to the sixth embodiment of the present invention.

Referring to FIG. 33, an optical element of a second example will be described.

FIG. 33 shows an optical element 60 including a relief layer 61, a reflective layer 62 and an adhesive layer 63 in addition to the first, second and third layers 11, 12 and 13, as in the optical element 60 of the first example described above. The optical element 60 of the second example further includes a substrate 64 between the third layer 13 and the relief layer 61. Of the surfaces of the substrate 64 facing away from each other, one surface is provided with the third layer 13 and the other surface is provided with the relief layer 61. The substrate 64 has optical transparency. When producing the optical element 60, the substrate 64 can serve as a support layer for the first layer 11 and the relief layer 61 which are formed with the substrate 64. The optical element 60 of the second example is observed from the substrate 64 side of the relief layer 61.

Third Example

Figure 34:
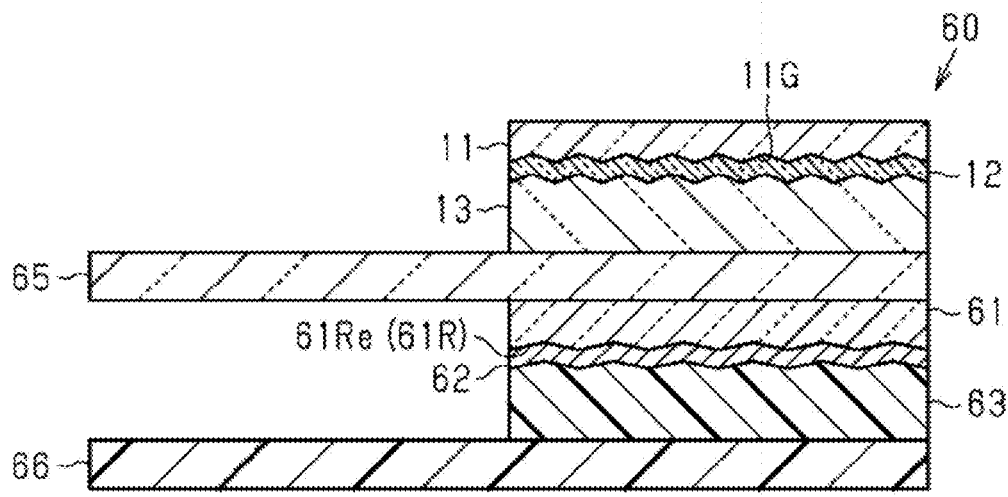
FIG. 34 is a schematic cross-sectional view illustrating a structure of a third example of the optical element according to the sixth embodiment of the present invention.

Referring to FIG. 34, an optical element of a third example will be described.

FIG. 34 shows an optical element 60 including a relief layer 61, a reflective layer 62 and an adhesive layer 63 in addition to the first, second and third layers 11, 12 and 13, as in the optical element 60 of the first example described above. The optical element 60 of the third example further includes a first substrate 65 and a second substrate 66. The first substrate 65 is located between the third layer 13 and the relief layer 61. The third layer 13 serves as an adhesive layer. Thus, a multilayered body configured by the first and second layers 11 and 12 is adhered to the first substrate 65 via the third layer 13. The adhesive layer 63 is adhered to the second substrate 66. The first substrate 65 has optical transparency. The second substrate 66 may or may not have optical transparency.

A first multilayered body configured by the first, second and third layers 11, 12 and 13 is located on part of the first substrate 65 as viewed perpendicular to the subwavelength grating 11G. A second multilayered body configured by the relief layer 61, the reflective layer 62 and the adhesive layer 63 is located on part of the second substrate 66 as viewed perpendicular to the relief surface 61Re. The first layer 11 overlaps the relief layer 61 as viewed in the thickness direction of the optical element 60.

Fourth Example

Figure 35:
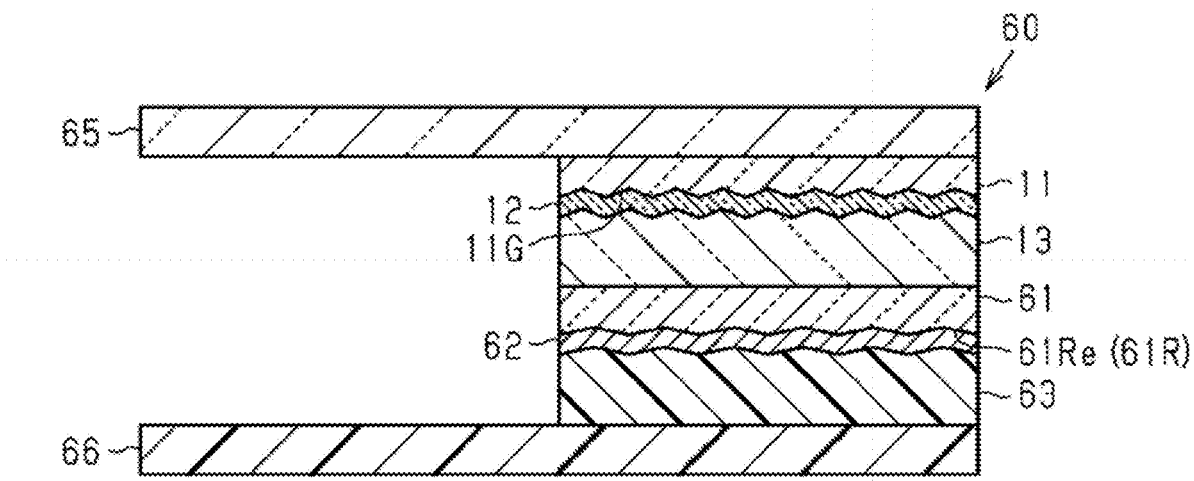
FIG. 35 is a schematic cross-sectional view illustrating a structure of a fourth example of the optical element according to the sixth embodiment of the present invention.

Referring to FIG. 35, an optical element of a fourth example will be described.

FIG. 35 shows an optical element 60 including a relief layer 61, a reflective layer 62 and an adhesive layer 63 in addition to the first, second and third layers 11, 12 and 13, as in the optical element 60 of the first example. The optical element 60 further includes a first substrate 65 and a second substrate 66. The third layer 13 serves as an adhesive layer and is adhered to the relief layer 61. The adhesive layer 63 is adhered to the second substrate 66.

The first multilayered body mentioned above is located on part of the first substrate 65 as viewed perpendicular to the subwavelength grating 11G. The second multilayered body is located on part of the second substrate 66 as viewed perpendicular to the relief surface 61Re. The first layer 11 overlaps the relief layer 61 as viewed in the thickness direction of the optical element 60.

The optical element 60 is observed from the reflective layer 62 side of the adhesive layer 63. Therefore, the first substrate 65 has optical transparency. The second substrate 66 may or may not have optical transparency.

In the first to third examples of the optical element 60, the substrates may each be paper, a plastic film, or the like. Each substrate may be provided with a print pattern. Alternatively, each substrate may be a multilayered body, and at least one of the layers of the substrate may be provided with a printed pattern.

As described above, the optical element according to the sixth embodiment achieves the following advantageous effects in addition to item (10) set forth above.

(12) Since a layer other than the first, second and third layers 11, 12 and 13 serves as a relief layer including a relief surface, flexibility of designing the relief layer is enhanced.

[Modification of Sixth Embodiment]

The sixth embodiment described above may be appropriately modified and implemented as follows.

[Substrate]

In the optical element 60 of the first to third examples, the substrates may each be smaller than the first multilayered body and/or the second multilayered body, as viewed perpendicular to the subwavelength grating 11G.

The first multilayered body including the first layer 11, and the second multilayered body including the relief layer 61 may be enclosed between two substrates. In other words, the first and second multilayered bodies may be laminated to each other in a state of being sandwiched between two substrates.

The substrates may each be a laser coloring layer producing color when irradiated with a laser beam. The substrate 64 of the second example may include information stored as a result of laser irradiation.

Also, in the optical element 60 of the third example, the first substrate 65 and/or second substrate 66 may include information stored as a result of laser irradiation. If the first substrate 65 includes information, only part of the second image may be observed due to the overlap of the second image displayed by the relief surface 61Re with the information included in the first substrate 65 as viewed in the thickness direction of the optical element 60. This may enhance resistance to counterfeiting in the optical element 60. In contrast, if the second substrate 66 includes information, the entirety of the first image displayed by the subwavelength grating 11G and the entirety of the second image displayed by the relief surface may be observed as viewed in the thickness direction of the optical element 60.

In the optical element 60 of the fourth example, if the first substrate 65 includes information, only part of the first image and part of the second image may be observed due to the overlap of the first image displayed by the subwavelength grating 11G and the second image displayed by the relief surface 61Re with the information included in the first substrate 65 as viewed in the thickness direction of the optical element 60. This may enhance resistance to counterfeiting in the optical element 60. In contrast, if the second substrate 66 includes information, the entirety of the first image displayed by the subwavelength grating 11G and the entirety of the second image displayed by the relief surface may be observed as viewed in the thickness direction of the optical element 60.

Seventh Embodiment

Figure 36:
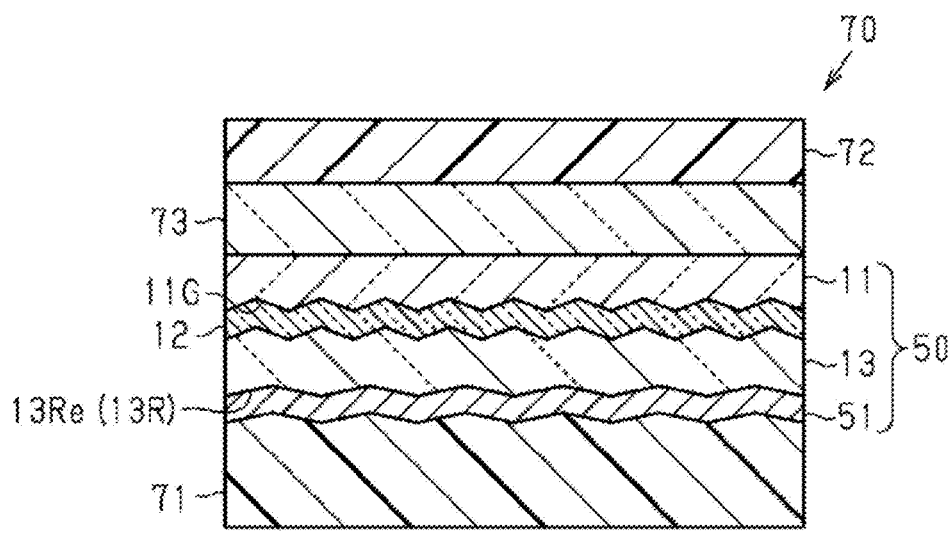
FIG. 36 is a schematic cross-sectional view illustrating a structure of a transfer foil according to a seventh embodiment of the present invention.

Referring to FIG. 36, a transfer foil including an optical element will be described. In a seventh embodiment of the present invention, a form of a transfer foil will be described taking the case where the optical element including a transfer foil is the first example of the optical element 50 according to the fifth embodiment.

FIG. 36 shows a transfer foil 70 including an adhesive member which includes the optical element 50 and an adhesive layer 71 for adhering the optical element 50 to a transfer target. The transfer foil 70 further includes a support layer 72 and a release layer 73. In the transfer foil 70, the support layer 72, the release layer 73, the optical element 50, and the adhesive layer 71 are laminated in this order. The optical element 50 after being transferred to a transfer target is observed from the side of the release layer 73 opposite to that facing the optical element 50. Therefore, the release layer 73 has optical transparency. When transferring the optical element 50, the release layer 73 is released from the support layer 72, and therefore the support layer 72 may or may not have optical transparency.

The transfer foil 70 includes a subwavelength grating 11G and a relief surface 13Re. Thus, the optical element 50 displaying the first and second images P1 and P2 can be transferred by transferring only part of the transfer foil 70 to a transfer target. The optical element 50 may be transferred by hot stamping.

[Modification of Seventh Embodiment]

[Transfer Foil]

A first transfer foil including a subwavelength grating 11G, and a second transfer foil including a relief surface 13Re may be prepared. Using these two transfer foils, an optical element can be formed. In this case, part of the first transfer foil and part of the second transfer foil may be transferred to a transfer target so that the subwavelength grating 11G included in the first transfer foil overlaps the relief surface 13Re included in the second transfer foil as viewed in the thickness direction of the optical element. In this case, when forming the optical element, the position where part of the first transfer foil is transferred is required to be aligned with the position where part of the second transfer foil is transferred. This may enhance resistance to counterfeiting in the optical element.

[Optical Element]

The transfer foil may include the optical element 10 of the first embodiment, the optical element 20 of the second embodiment, the optical element 30 of the third embodiment, or the optical element 40 of the fourth embodiment instead of the above optical element 50. Alternatively, the transfer foil may include the optical element 50 according to the second example of the fifth embodiment or the optical element 60 according to the first or second example of the sixth embodiment instead of the above optical element 50.

Eighth Embodiment

Figure 37:
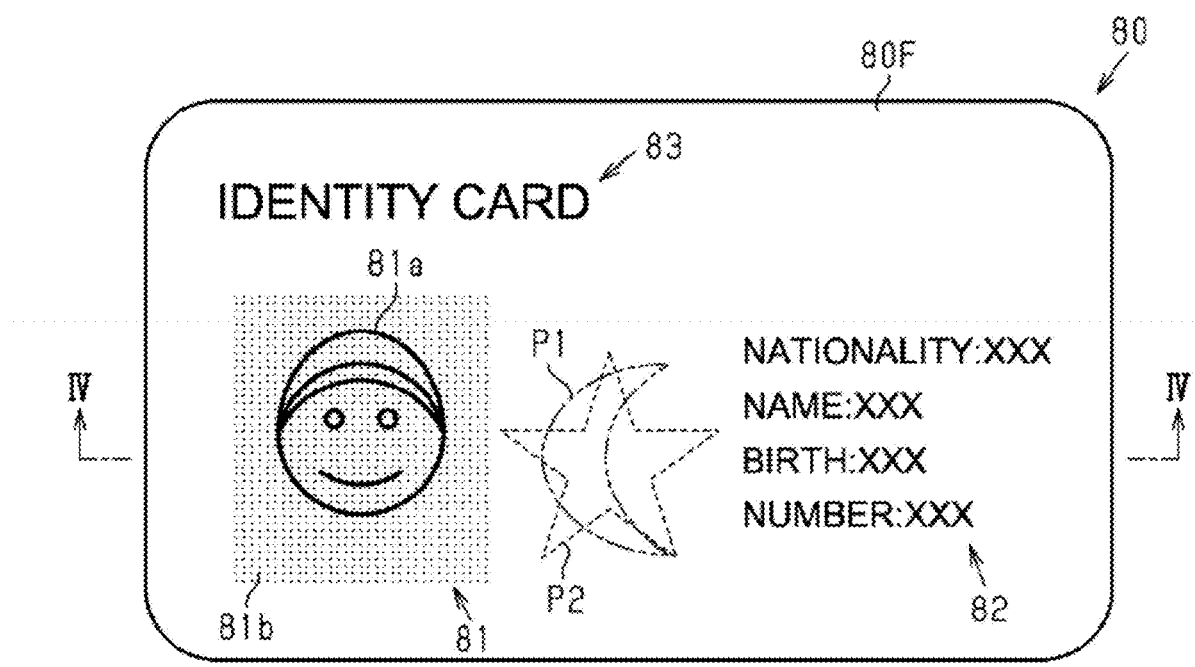
FIG. 37 is a schematic plan view illustrating a structure of an authentication medium according to an eighth embodiment of the present invention.
Figure 38:
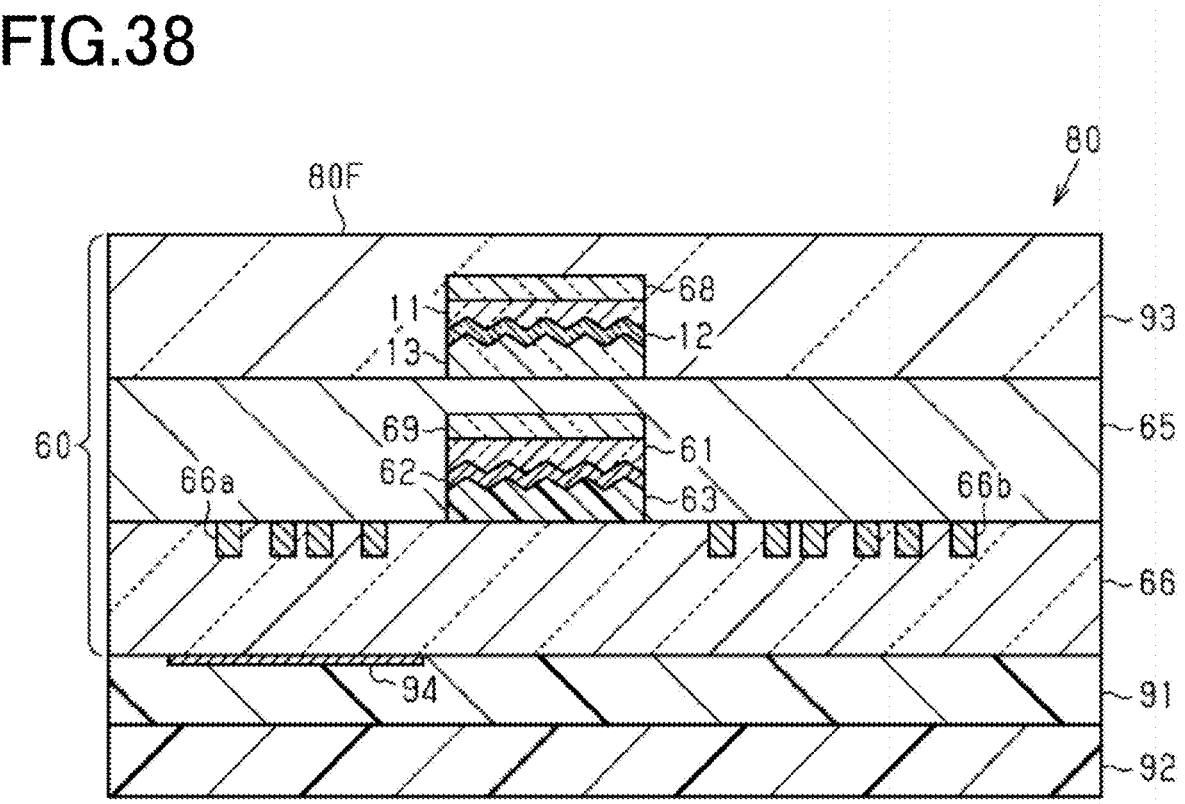
FIG. 38 is a schematic cross-sectional view illustrating a structure taken along the line Iv-Iv of FIG. 37.

Referring to FIGS. 37 and 38, an authentication medium according to an eighth embodiment of the present invention will be described. A card will be described below as an example of an authentication medium. Examples of the card according to the embodiment of the present invention include ID cards, drivers licenses, various other license cards, member cards and credit cards. This card includes the third example of the optical element 60 according to the sixth embodiment as part of the card.

[Configuration of Card]

FIG. 37 shows a card 80 having a two-dimensional planar shape as viewed perpendicular to a front surface 80F of the card 80. The card 80 displays a first image 81, a second image 82 and a third image 83 via the front surface 80F. The card 80 also displays a first image P1 and a second image P2 via the front surface 80F.

In the present embodiment, the first image 81 includes a facial image 81a and a background image 81b. The facial image 81a shows the face of the owner of the card 80. The background image 81b surrounds the facial image 81a and forms the background of the facial image 81a. The second image 82 includes information associated with the owner of the card 80. The second image 82 includes information represented by characters and numerals. The third image 83 includes information associated with the card 80. The information included in the third image 83 is the type of the card 80. The facial image 81a and the second image 82 are identification information for identifying the owner of the card. The card 80 may only have to display the first and second images P1 and image P2 via the front surface 80F. The above images are only examples of images that can be displayed by the card 80.

FIG. 38 shows a cross-sectional structure of the card 80 taken along the line Iv-Iv of FIG. 37.

As shown in FIG. 38, the card 80 as an example of an authentication medium includes an optical element 60. The optical element 60 may cover the identification information. In the optical element 60 included in the card 80, the first multilayered body including a first layer 11, a second layer 12 and a third layer 13 further includes a release layer 68. The release layer 68 covers the first layer 11. The second multilayered body including a relief layer 61, a reflective layer 62 and an adhesive layer 63 further includes a release layer 69. The release layer 69 covers the relief layer 61. In the optical element 60, the second multilayered body is covered with a first substrate 65.

Before being irradiated with a laser beam, all or part of a second substrate 66 may be imparted with properties of developing color by laser irradiation. The color developed by laser irradiation may be due to carbonization. Specifically, before being irradiated with a laser beam, all or part of the second substrate 66 may be imparted with properties of being carbonized by laser irradiation. The second substrate 66 of the card 80 includes first color-developed portions 66a and second color-developed portions 66b which have developed colors by laser irradiation. The first color-developed portions 66a display the facial image 81a, and the second color-developed portions 66b display the second image 82.

The card 80 includes a white layer 91, a lower protective layer 92 and an upper protective layer 93. The white layer 91 is white and contacts the second substrate 66. A part of the surface of the white layer 91 contacting the second substrate 66 is provided with a print pattern 94. As viewed in the thickness direction of the card 80, the print pattern 94 is located in a region overlapping the first color-developed portions 66a. The print pattern 94 displays the background image 81b.

The lower protective layer 92 is located on a surface of the white layer 91 facing away from the surface contacting the second substrate 66. The upper protective layer 93 covers the first substrate 65, with the first multilayered body being enclosed between itself and the first substrate 65. The upper protective layer 93 has optical transparency. The lower protective layer 92 may or may not have optical transparency.

[Modification of Eighth Embodiment]
[Authentication Medium]

The authentication medium is not limited to a card but may be embodied in the forms of other authentication media, such as a passport, used for verifying the owners.

[Optical Element]

The authentication medium may include the optical element 10 of the first embodiment, the optical element 20 of the second embodiment, the optical element 30 of the third embodiment, the optical element 40 of the fourth embodiment or the optical element 50 of the fifth embodiment instead of the above optical element 60. The authentication medium may include the optical element 60 of the first, second or fourth example according to the sixth embodiment instead of the above optical element 60.

Ninth Embodiment

Referring to FIGS. 39 to 46, an authentication medium according to a ninth embodiment of the present invention will be described. Another example of a card will be described as an example of the authentication medium.

[Configuration of Card]

Figure 39:
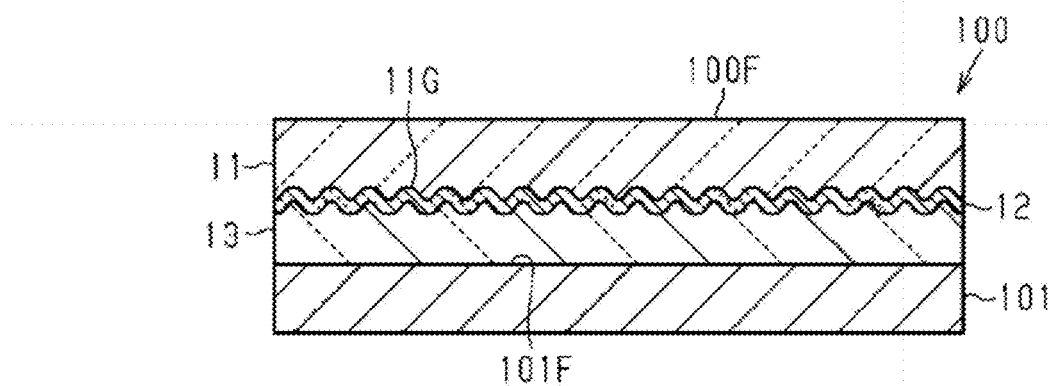
FIG. 39 is a schematic cross-sectional view illustrating a structure of an authentication medium according to a ninth embodiment of the present invention.

Referring to FIG. 39, a configuration of a card will be described. A card including an optical element 10 of the first embodiment will be described as an example of the card. However, the card is not limited to one including the optical element 10 of the first embodiment but may include any of the optical elements of the second to sixth embodiments.

A card 100 includes a display layer 101 in addition to a first layer 11, second layer 12 and a third layer 13. The display layer 101 can display predetermined information. The display layer 101 can display predetermined information with characters, numerals, figures, a QR code (registered trademark), or the like. In the card 100, the surface of the first layer 11 facing away from the surface contacting the second layer 12 is a front surface 100F.

The display layer 101 can display predetermined information by a print pattern provided on a display surface 101F contacting the third layer 13. The print pattern on the display surface 101F can be formed by letterpress printing, gravure printing, offset printing or screen printing. The ink used for printing may be a functional ink. The functional ink may be an ink whose color changes according to the type or state of the light source emitting light onto the card 100, an ink whose color and gloss change according to the observation angle of the observer, or other inks. The ink whose color changes according to the type or state of the light source may be a phosphorescent ink, a fluorescent ink or a photochromic ink. The ink whose color and gloss change according to the observation angle may be a pearl ink, a magnetic ink or a color-shifting ink.

Phosphorescent ink absorbs and stores light energy emitted such as from the sunlight or fluorescent light and gradually emits light in the dark. Photochromic ink develops color by reaction with ultraviolet light. Photochromic ink exhibits different colors such as red, blue, purple and yellow according to the irradiation intensity of ultraviolet light to the photochromic ink. The pearl ink is an ink to which a pearl pigment is added. The pearl ink has a gloss that changes according to the observation angle. The pearl ink, which contains a pearl pigment made from polarized pearl, also has a hue that changes according to the observation angle. According to such functional inks, it may be easy to confirm whether the color of a print pattern formed on the display surface 101F changes. Thus, the authenticity of the card 100 can be reliably verified based on the color of the print pattern.

The method of providing a print pattern on the display surface 101F may be inkjet printing, thermal printing, laser printing, or the like. Using these methods, information can be provided on the display surface 101F for each of cards 100. Thus, a design common to a plurality of cards 100 is preferred to be printed at a relatively high speed by the printing methods mentioned above, and identification information for identifying each card 100 is preferred to be printed by inkjet printing, thermal printing, laser printing, or the like.

As mentioned above, the optical element included in the card 100 is not limited to the optical element 10 of the first embodiment but may be the optical element of the fifth or sixth embodiment. Specifically, the card 100 may display a first image P1 displayed by the subwavelength grating 11G, a second image P2 displayed by the relief surface, and a third image displayed by the display layer 101. In such a card 100, if the brightness of the first and second images P1 and P2 is sufficiently high, the third image is less likely to be observed from the observation angles at which the first and second images P1 and P2 are respectively displayed. However, the third image is observed from the observation angle at which neither the first image P1 nor the second image P2 is displayed. Therefore, the observer can observe the third image.

The observation angles at which the first and second images P1 and P2 are respectively observed can be optionally determined according to the observation angles at which the first and second images P1 and P2 respectively appear, i.e., according to the configurations of the subwavelength grating 11G and the relief surface.

In the card 100, the multilayered body configured by the first, second and third layers 11, 12 and 13 is preferred to have a transmittance of 70% or more in a direction in which the three layers are laminated. Thus, the image displayed by the card 100 may be easy to observe. In this case, in particular, if the optical element, i.e., the multilayered body configured by the first, second and third layers 11, 12 and 13, covers the identification information, the identification information may be even more easily identified. For example, according to Article 195 of the Safety Standards for Road Transport Vehicles, the front and side windows of automobiles are required to have a transmittance of 70% or more. In view of this standard also, for people to clearly and reliably observe information, a transparent member passing light for displaying information therethrough is preferred to have a transmittance of 70% or more.

The transmittance of a transparent multilayered body can be measured using a spectrophotometer. In an environment where the card 100 is observed, the light source is assumed to be the sunlight or fluorescent light. Thus, as a transmittance of the multilayered body used for the card 100, the transmittance at a wavelength of 500 nm is preferred to be measured. The transmittance of a multilayered body is preferred to be measured by the method according to "How to calculate total luminous transmittance and reflectance of plastics" of Japanese Industrial Standards (JIS) K7375:2008.

[Functions of Card]

Referring to FIGS. 40 to 46, functions of the card 100 will be described. Functions of first and second examples of the card 100 will be sequentially described. The first example of the card 100 includes an optical element provided with a subwavelength grating 11G and a relief surface, and is configured to verify the authenticity of the card 100 by the observer's visual observation. The second example of the card 100 includes an optical element provided with a sub-wavelength grating 11G but not provided with a relief surface, and is configured to verify the authenticity of the card 100 by a verifier.

First Example

Referring to FIGS. 40 to 43, the functions of a card 100 in the first example will be described.

Figure 40:
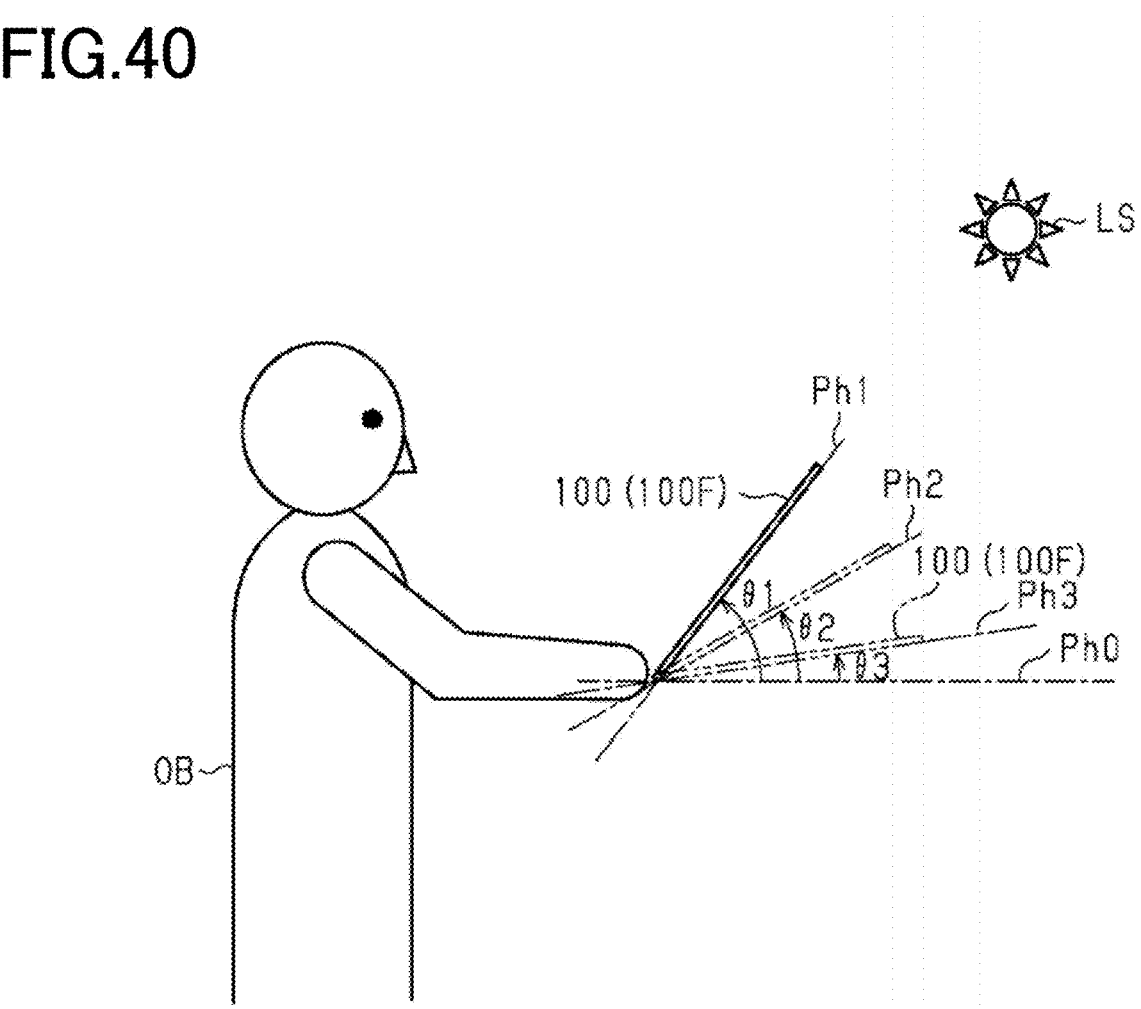
FIG. 40 is a schematic diagram illustrating functions of a first example of the authentication medium according to the ninth embodiment of the present invention.

FIG. 40 schematically shows a method of verifying the authenticity of the card 100 by visual observation by the observer OB.

As shown in FIG. 40, the observer OB observes the card 100 by holding it in their hand. A reference plane Ph0 is a plane on which the card 100 is placed when the observer OB starts observing the card 100. The reference plane Ph0 is a base plane when verifying the authenticity of the card 100. The observer OB may tilt the card 100 placed on the reference plane Ph0 so as to be located on a first plane Ph1, a second plane Ph2 or a third plane Ph3. The observer OB may observe the card 100 when the card 100 is located in the plane Ph1, Ph2 or Ph3. The angle formed by the reference plane Ph0 and the first plane Ph1 is a first angle θ1, the angle formed by the reference plane Ph0 and the second plane Ph2 is a second angle θ2, and the angle formed by the reference plane Ph0 and the third plane Ph3 is a third angle θ3. The first angle θ1 is greater than the second angle θ2 and the third angle θ3, and the second angle θ2 is greater than the third angle θ3.

A light source LS is located on the side of the card 100 opposite to that facing the observer OB. In other words, the light source LS is located ahead of the observer OB. The light source LS, the card 100 and the observer OB are relatively located at positions so that the light of the light source LS incident on the card 100 is reflected off the card 100 toward the observer OB. When observing the card 100, light from a point light source is preferably incident on the card 100 from one direction. However, actually, when observing the card 100, light from fluorescent light or outside light is incident on the card 100 from various directions. In this case also, as long as the light incident on the card 100 includes light reflected off the card 100 toward the observer OB, the observer OB can observe the information displayed on the card 100, although the brightness of the light emerging from the card 100 may be lowered.

Figure 41:
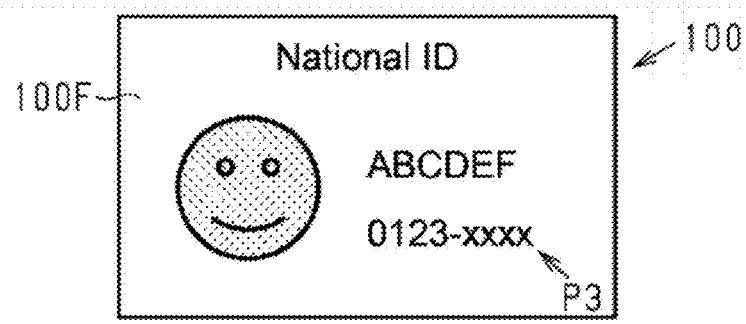
FIG. 41 is a schematic diagram illustrating functions of the first example of the authentication medium according to the ninth embodiment of the present invention.
Figure 42:
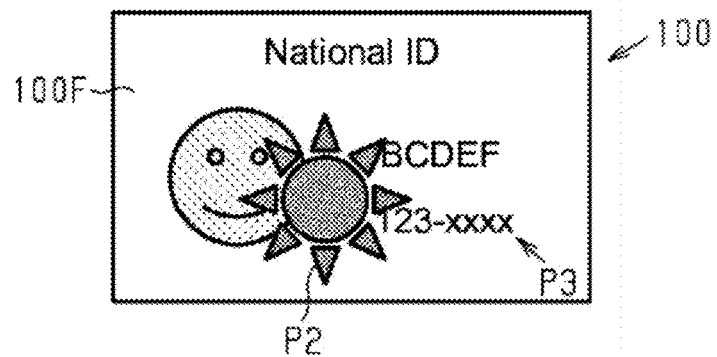
FIG. 42 is a schematic diagram illustrating functions of the first example of the authentication medium according to the ninth embodiment of the present invention.
Figure 43:
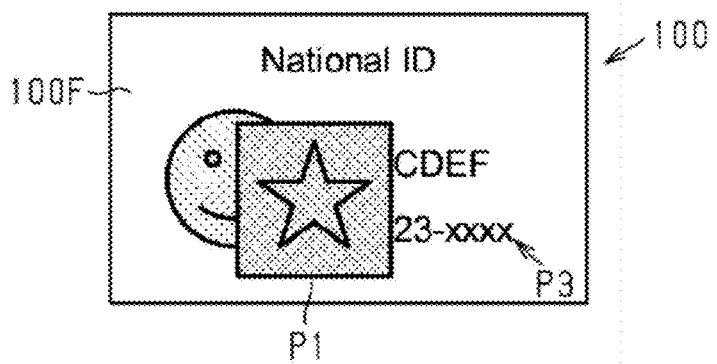
FIG. 43 is a schematic diagram illustrating functions of the first example of the authentication medium according to the ninth embodiment of the present invention.

FIGS. 41 to 43 show images displayed on the card 100. FIG. 41 shows an image displayed on the card 100 when the card 100 is located on the first plane Ph1, and FIG. 42 shows an image displayed on the card 100 when the card 100 is located on the second plane Ph2. FIG. 43 shows an image displayed on the card 100 when the card 100 is located on the third plane Ph3. The card 100 is configured to display first, second and third images P1, P2 and P3.

As shown in FIG. 41, when the observer OB places the card 100 on the first plane Ph1, the card 100 displays only the third image P3. The third image P3 may include identification information for identifying the card 100. The identification information in the third image P3 identifying the owner may be, for example, the owner's facial image, name and ID number. When the observer OB places the card 100 on the first plane Ph1, the card 100 externally displays the entire third image P3 via the front surface 100F.

As shown in FIG. 42, when the observer OB places the card 100 on the second plane Ph2, the card 100 displays the second image P2. The second image P2 overlaps part of the third image P3 as viewed perpendicular to the front surface 100F of the card 100. Thus, in the present embodiment, part of the third image P3 is hidden by the second image P2. The brightness of the second image P2 may be of a level not completely hiding part of the third image P3.

As shown in FIG. 43, when the observer OB places the card 100 on the third plane Ph3, the card 100 displays the first image P1. In this case, the card 100 does not display the second image P2. The first image P1 overlaps part of the third image P3 as viewed perpendicular to the front surface 100F of the card 100. Thus, in the present embodiment, part of the third image P3 is hidden by the first image P1. The brightness of the first image P1 may be of a level not completely hiding part of the third image P3.

In this manner, when the observer OB tilts the card 100 toward themselves with respect to the reference plane Ph0, the card 100 displays the first image P1 or the second image P2 according to the position of the card 100. In other words, when the observer OB brings the front surface 100F of the card 100 to face more toward the observer OB in an observation space, in a state where the position of the part of the card 100 held by the observer OB is substantially fixed, the card 100 displays the first image P1 or the second image P2 according to the position of the card 100.

It should be noted that, when the observer OB tilts the card 100 right and left using the second plane Ph2 as a base plane, the observer OB can observe the first and second images P1 and P2 displayed on the card 100. In other words, when the observer OB tilts the card 100 without substantially changing the distance between the front surface 100F of the card 100 and the observer OB in an observation space, the observer OB can observe the first and second images P1 and P2. However, the observer OB, who can easily observe the second image P2, can observe the first image P1 only under limited observation conditions, for the reasons provided below.

As described above, the first image P1 is observed by the observer OB only when the light source LS and the observer OB are at symmetric angular positions with respect to a plane including a normal line to the surface of the card 100. Thus, if the card 100 is tilted right and left with reference to the second plane Ph2, the angle between the second plane Ph2 and the reference plane Ph0 is required to be the third angle θ3. The second plane Ph2 is a plane on which the observer OB naturally places the card 100 when it is in their hand. Thus, the angle between the second and reference planes Ph2 and Ph0 has a low probability of matching the third angle θ3. In contrast, the observer OB has a high probability of placing the card 100 on the third plane Ph3 when tilting the card 100 up and down with respect to the reference plane Ph0.

Consequently, when observing the card 100, i.e., an authentication medium, the observer OB can determine the authenticity by tilting the card 100 up and down, with the light source LS located obliquely above the plane including the line of sight of the observer OB. This may increase the probability of the observer OB observing both the first and second images P1 and P2. Thus, authenticity of the card 100 can be easily and accurately verified by the observer OB.

Second Example

Figure 44:
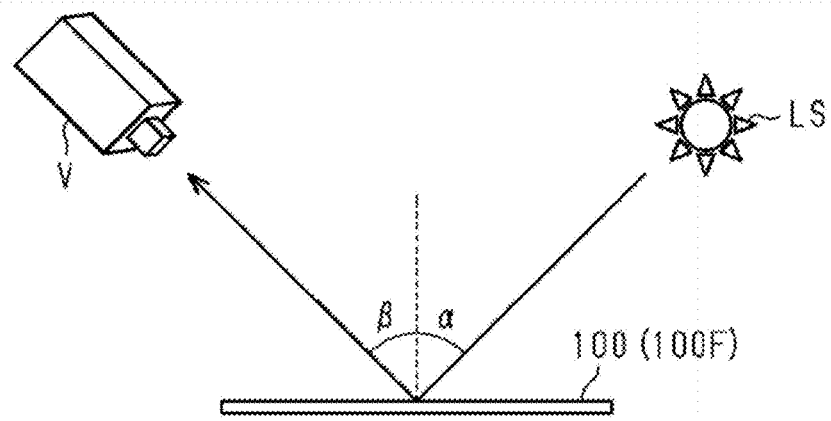
FIG. 44 is a schematic diagram illustrating functions of a second example of the authentication medium according to the ninth embodiment of the present invention.
Figure 45:
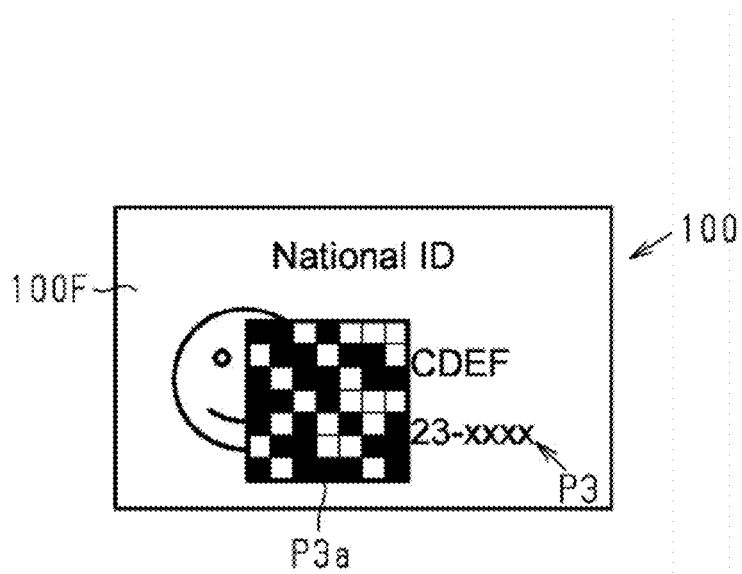
FIG. 45 is a schematic diagram illustrating functions of the second example of the authentication medium according to the ninth embodiment of the present invention.
Figure 46:
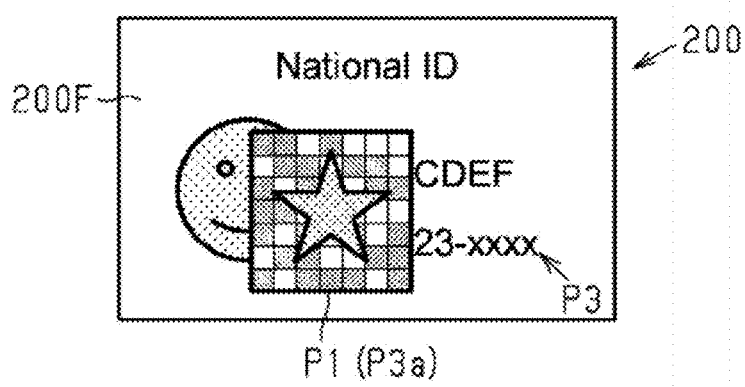
FIG. 46 is a schematic diagram illustrating functions of the second example of the authentication medium according to the ninth embodiment of the present invention.

Referring to FIGS. 44 to 46, functions of a card 100 in the second example will be described.

FIG. 44 schematically shows a method of verifying the authenticity of a card 100 using a verifier V.

As shown in FIG. 44, an environment for verifying the authenticity of the card 100 is established such that the light from a light source LS is incident on a front surface 100F of the card 100 at an incidence angle α, and that the light reflected at an emergence angle β enters the verifier V. The verifier V may be, for example, a camera capable of capturing an image, a sensor capable of detecting a luminance distribution, or the like. Any device may be used as the verifier V as long as the device can process the first image P1 as an image or as optical information such as brightness.

FIG. 45 shows an image displayed by a genuine card 100. FIG. 46 shows an image displayed by a counterfeit card 200. FIGS. 45 and 46 respectively show images displayed by the cards 100 and 200 under specific observation conditions.

As shown in FIG. 45, the genuine card 100 displays a QR code (registered trademark) P3a as part of a third image P3.

In contrast, as shown in FIG. 46, the counterfeit card 200 displays the QR code P3a as part of a third image P3 simultaneously with a first image P1, via a surface 200F. When the verifier V reads the QR code P3a displayed on the card 100 under the above observation conditions, the card 100 is verified as being genuine. In this case, since the card 100 displays the QR code P3a as part of the third image P3, and the QR code P3a does not overlap another image, the verifier V can verify the card 100 as being genuine. In contrast, the card 200 displays the QR code P3a as part of the third image P3, but also displays the first image P1 overlapping the QR code P3a as viewed in the thickness direction of the card 200. In other words, the information read by the verifier V includes information other than the QR code. Thus, the verifier V can verify that the card 200 is a counterfeited card.

In the present embodiment, a QR code P3a is used as a code displayed on the cards 100 and 200, but the code displayed on the cards 100 and 200 may be any other code as long as it can be read by the verifier V. Other codes may include a barcode. The first image P1 or the second image P2 may be used for the verification using the verifier V instead of the third image P3.

In the example described above, the position of the verifier V is fixed. However, the verifier V may be a movable device and may read light emerging from the card 100 at an angle γ different from the above emergence angle (3, in addition to reading light at the emergence angle β. In this case, the authenticity of the card 100 can be doubly verified using two pieces of information obtained at different angles. This may further increase the accuracy of verifying the authenticity.

[Material for Forming Optical Element]

Material that can be used for forming the optical element will be described. The following description explains materials for forming the first, second and third layers 11, 12 and 13 of an optical element.

[First and Third Layers]

Materials for the first and third layers 11 and 13 may substantially contain various plastics as follows. Examples of the materials for forming these layers include poly (meth) acrylic resins, polyurethane resins, fluororesins, silicone resins, polyimide resins, epoxy resins, polyethylene resins, polypropylene resins, methacrylic resins, polymethylpentene resins, cyclic polyolefin resins, polystyrene resins, polyvinyl chloride resins, polycarbonate resins, polyester resins, polyamide resins, polyamideimide resins, polyaryl phthalate resins, polysulfone resins, polyphenylene sulfide resins, polyether sulfone resins, polyethylene naphthalate resins, polyether imide resins, acetal resins and cellulose resins. Of these resins, one, or two or more as a mixture or a composite may be used for forming the first and third layers. The materials for forming the first and third layers 11 and 13 may contain at least one of a curing agent, a plasticizer, a disperser, various leveling agents, a UV absorber, an antioxidant, a viscosity modifier, a lubricant, a light stabilizer, and the like.

The method of forming the first and third layers 11 and 13 may be heat embossing, casting, or photopolymerization. In photopolymerization involves, a radiation curable resin may be cast between a flat substrate such as a plastic film and a metal stamper. Then, the radiation curable resin may be cured by radiation, and then the cured resin film may be released from the metal stamper together with the substrate. Photopolymerization has a higher accuracy of transferring asperities and higher thermal resistance and chemical resistance, compared to pressing or casting using a thermoplastic resin.

[Second Layer]

As mentioned above, an optically transparent dielectric material may be used for the second layer 12. As the dielectric material, a metal, metal compound, silicon compound, or a mixture thereof may be used. Examples of the dielectric material include ZnS, ZnO, ZnSe, $SiN_x$, $SiO_x$, $Ti_xO_x$, $Ta_2O_5$, $Cr_2O_3$, $ZrO_2$, $Nb_2O_5$ and ITO.

The method of forming the second layer 12 may be, for example, physical vapor deposition, chemical vapor deposition, or the like. The physical vapor deposition may be vacuum deposition, sputtering, ion plating, or a method using a cluster ion beam. The chemical vapor deposition may be plasma chemical vapor deposition, thermochemical vapor deposition, or photochemical vapor deposition. The vacuum deposition can easily enhance productivity. Ion-plating can easily provide a high-quality reflective layer. Film forming conditions in physical vapor deposition or chemical vapor deposition may be suitably selected according to the material used for the reflective layer.

The second layer 12 may also be formed using various printing methods, casting, die coating, or the like. In this case, the second layer 12 may be formed of a resin in which at least one of the above dielectric materials is dispersed.

EXAMPLES

Example 1

Example 1 will be described. Example 1 corresponds to the authentication medium of the eighth embodiment described above. In Example 1, a first transfer foil including a first layer 11, and a second transfer foil including a relief layer 61 were prepared. Part of the first transfer foil was transferred to the first substrate 65, and part of the second transfer foil was transferred to the second substrate 66. As the second substrate 66, a substrate producing color by laser irradiation was used. The first and second substrates 65 and 66 were laminated together to obtain an ID card as an authentication medium of Example 1.

More specifically, when preparing the first transfer foil, a PET film having a thickness of 38 μm (Lumirror (registered trademark) manufactured by Toray Industries, Inc.) was used as a support layer. A release layer ink was applied to a surface of the support layer and dried to obtain a release layer 68. The release layer 68 had a thickness of 1 Next, a first layer ink was applied onto the release layer 68 by gravure printing and dried. The first layer ink had a dry thickness of 2 μm. An original plate was pressed against the dried first layer ink to form a subwavelength grating 11G. When forming the subwavelength grating 11G, the pressing pressure, temperature and speed were respectively set to 2 $Kgf/cm^2$, 80° C. and 10 m/min.

Simultaneously with forming the subwavelength grating 11G, the first layer ink was irradiated with ultraviolet light from the side of the support layer opposite to that facing the release layer 68. The ultraviolet light was applied by using a high-pressure mercury lamp, with the output of the lamp being set to 300 $mJ/cm^2$. Thus, the first layer ink was cured to obtain a first layer 11. Then, a TiO2 film having a thickness of 50 nm was formed on the first layer 11 by vacuum deposition. In this way, a second layer 12 was obtained. Next, an adhesive layer ink was applied to the second layer 12 and dried to obtain a third layer 13 having a thickness of 2.5 μm or more and 4 μm or less and serving as an adhesive layer. The drying temperature was set to 120° C., and the time was set to 45 seconds. When forming the second transfer foil, the same method as the method used for the first transfer foil was used except that the original plate used for forming a relief surface 61Re differed from the original plate for forming the subwavelength grating 11G.

Inks having the following compositions were used as the release layer ink, the first layer ink, the relief layer ink, the third layer ink, and the adhesive layer ink.

[Release Layer Ink]
Acrylic resin 70.0 parts by mass
Methyl ethyl ketone 30.0 parts by mass
[First Layer Ink/Relief Layer Ink]
Ultraviolet curable acrylic acrylate resin 70.0 parts by mass
Methyl ethyl ketone 30.0 parts by mass
[Third Layer Ink/Adhesive Layer Ink]
Urethane resin 50.0 parts by mass
Silica filler 10.0 parts by mass
Methyl ethyl ketone 40.0 parts by mass As a first substrate 65, a transparent polycarbonate substrate (LEXAN SD8B14 manufactured by SABIC) (LEXAN is a registered trademark) having a thickness of 100 μm was used. As a second substrate 66, a polycarbonate substrate (LEXAN SD8B94 manufactured by SABIC) having a thickness of 100 μm and producing color by being irradiated with a laser beam was used. The first transfer foil was transferred to the first substrate 65, and then the support layer was removed. The second transfer foil was transferred to the second substrate 66, and then the support layer was removed. The foils were transferred by using an electric hot stamp, and by setting the temperature and pressure of the surface of the hot stamp contacting the transfer foils to 120° C. and 1.05 $t/cm^2$, and the pressing time to 1 second.

Then, as a white layer 91, a white plastic film (LEXAN SD8B24 manufactured by SAVIC) having a thickness of 400 μm was used. As a lower protective layer 92 and an upper protective layer 93, transparent plastic films (LEXAN SD8B14) each having a thickness of 100 μm were used. Then, the lower protective layer 92, the white layer 91, the second substrate 66, the first substrate 65, and the upper protective layer 93 stacked in this order were laminated. When laminating these layers, the temperature, pressure, and heating and pressing time were respectively set to 200° C., 80$N/cm^2$ and 25 minutes. The laminated multilayered bodies were cut to a card shape.

The multilayered bodies were irradiated with a laser beam having a wavelength of 1,064 nm by using a laser marker. Thus, first color-developed portions 66a and second color-developed portions 66b were formed on the second substrate 66. As a result, an ID card of Example 1 was obtained.

Figure 47:
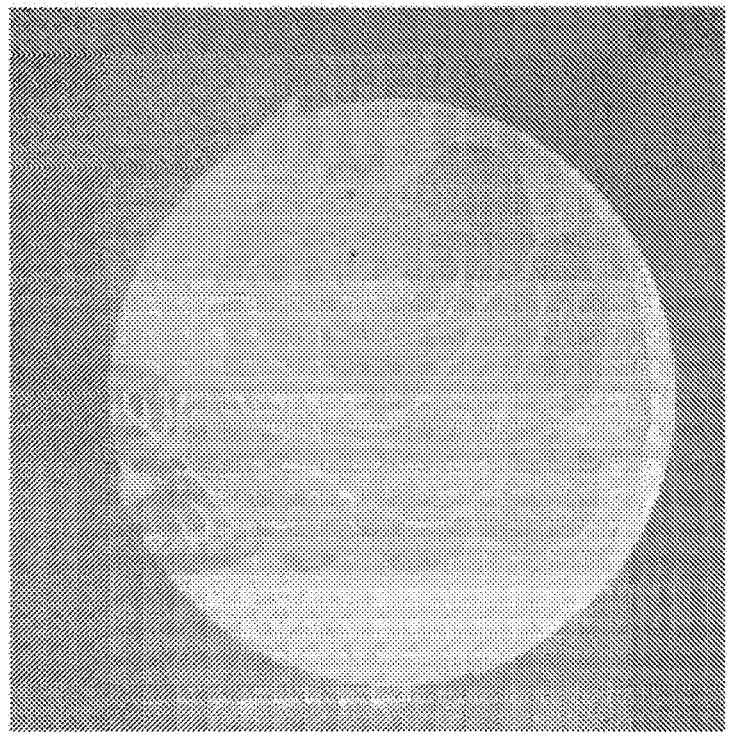
FIG. 47 shows a first image displayed on an ID card of Example 1.
Figure 48:
FIG. 48 shows a second image displayed on the ID card of Example 1.

FIG. 47 shows the first image, which is a colored image displayed on the ID card, and FIG. 48 shows the second image, which is a monochromatic image displayed on the ID card. As shown in FIGS. 47 and 48, it was confirmed that the ID card could display both the first and second images.

Example 2

Example 2 will be described below. The transfer foil of Example 2 corresponds to the transfer foil of the seventh embodiment described above. In Example 2, first, a support layer 72 that was the same as in Example 1 was prepared. A release layer 73 was formed on a surface of the support layer by a method similar to that of Example 1. Then, using a method similar to that of Example 1, a first layer 11 was formed on the release layer 73, and a second layer 12 was formed on the first layer 11.

Next, a third layer ink was applied to the second layer 12 and dried by a method similar to the method used when forming the first layer 11 using the first layer ink. An original plate was pressed against the dried third layer ink to form a relief surface 13Re. Various forming conditions were set similarly to those used when forming the subwavelength grating 11G.

Then, a fourth layer 51 was formed on the relief surface 13Re by using a method similar to the method used for forming the second layer 12. Furthermore, an adhesive layer 71 was formed on the fourth layer 51 by using a method similar to the method used for forming the third layer 13 in Example 1. In this manner, a transfer foil of Example 2 was obtained. The third layer ink for forming the third layer 13 in Example 2 had the same composition as that of the first layer ink in Example 1.

Several embodiments of the present invention have been described so far referring to the drawings. However, specific configurations are not limited to these embodiments, but the present invention can encompass designs within the range not departing from the scope of the present invention and all the embodiments achieving advantageous effects equivalent to those aimed at by the present invention. Furthermore, the scope of the present disclosure is not limited to the features of the invention defined by the claims, but may encompass all the disclosed features and all the combinations of the features.

The term of device, pixel, segment, unit, printed matter or article as used herein is a physical entity. The physical entity may refer to a physical mode or a spatial mode surrounded by materials. The physical entity may be a structure. The structure may have a specific function. A combination of structures having specific functions can exhibit synergistic effects by combination of the functions of the structures.

Terms used in the present disclosure and especially in the appended claims (e.g., the bodies of the appended claims) are generally intended as "open" terms (e.g., the term "have" should be interpreted as "at least have", and the term "include" should be interpreted as "include but is/are not limited to".

When understanding terms, configurations, features, aspects or embodiments, the drawings should be referred to as necessary. Matters that can be directly and unambiguously derived from the drawings should be grounds for amendment comparable to the texts.

Furthermore, if a specific number in an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim list. However, the use of such phrases should not be construed to imply that the introduction of a claim recitation by the indefinite articles "a" or "an" limits any particular claim containing such claim to embodiments containing only one such recitation. The introductory phrase "one or more" or "at least one" and the indefinite article "a" or "an" (e.g., "a" and/or "an") should be at least interpreted as meaning "at least one or more." "one" or "one or more"). The same holds true for the use of definite articles used to introduce claim

What is claimed is:

1. An optical element, comprising:
   a first layer,
   a second layer contacting the first layer, and
   a third layer contacting the second layer, each layer having optical transparency, wherein
   the first layer is a resin layer having a first refractive index and having a first surface contacting the second layer, at least part of the first surface including a subwavelength grating;
   the second layer is a dielectric layer having a second refractive index which is higher than the first refractive index and having a second surface contacting the first surface of the first layer, the second surface having asperities conforming to the subwavelength grating;
   the third layer is a resin layer having a third refractive index lower than the second refractive index;
   any of the first layer, the second layer, and the third layer is a relief layer, the relief layer having a relief surface including a plurality of reflective surfaces, the reflective surfaces adjacent to each other having a pitch therebetween greater than a pitch of the subwavelength grating;
   when observing a state in which light is applied to the optical element from a light source located on a side of the second layer opposite to that facing the third layer, from the light source side,
   the subwavelength grating displays a colored image exhibiting a color corresponding to a grating period of the subwavelength grating in reflection directions including a specular reflection direction, and
   the relief surface displays a reflection image in monochromatic reflected light in reflection directions including a direction different from the specular reflection direction;
   the optical element has a first state in which neither the colored image nor the reflection image is displayed, a second state in which the colored image is mainly displayed, and a third state in which the reflection image is mainly displayed;
   a plane in which the optical element is disposed and a plane including a line of sight of an observer form an observation angle therebetween;
   the optical element is observed in any of the first state, the second state, and the third state according to the observation angle, and
   the second layer is the relief layer; and
   the relief surface is a surface of the second layer facing away from the second surface.

2. The optical element of claim 1, wherein
   the optical element is observed in a state in which the colored image is displayed in a first observation angular range, and is observed in a state in which the reflection image is displayed in a second observation angular range; and
   the second observation angular range is greater than the first observation angular range.

3. The optical element of claim 1, wherein the colored image and the reflection image are correlated to each other.

4. The optical element of claim 3, wherein the reflection image is located outside the colored image and has a shape conforming to a contour of the colored image.

5. The optical element of claim 3, wherein
   either of the colored image and the reflection image has a shape representing a predetermined symbol or a predetermined object; and
   the other of the colored image and the reflection image represents characters indicating the shape.

6. The optical element of claim 3, wherein the colored image, coupled with the reflection image, provides a shape representing a set of objects.

7. A transfer foil, comprising:
   an adhesive member,
   the adhesive member including the optical element of claim 1, and,
   an adhesive layer for adhering the optical element to a transfer target.

8. An authentication medium comprising the optical element of claim 1, wherein the optical element covers identification information.

9. The authentication medium of claim 8, further comprising a display layer displaying predetermined information.

10. A method of verifying an authentication medium, comprising the steps of:
    verifying authenticity of the authentication medium of claim 9 by an observer tilting the authentication medium up and down and observing the authentication medium in a state in which a light source is located obliquely above a plane including a line of sight of the observer.

* * * * *